(12) United States Patent
Brooker et al.

(10) Patent No.: US 10,250,673 B1
(45) Date of Patent: Apr. 2, 2019

(54) STORAGE WORKLOAD MANAGEMENT USING REDIRECTED MESSAGES

(71) Applicant: Amazon Technologies, Inc., Reno, NV (US)

(72) Inventors: Marc John Brooker, Seattle, WA (US); Marc Stephen Olson, Bellevue, WA (US); Benjamin Arthur Hawks, Seattle, WA (US); James Michael Thompson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 282 days.

(21) Appl. No.: 14/212,023

(22) Filed: Mar. 14, 2014

(51) Int. Cl.
H04L 29/08 (2006.01)

(52) U.S. Cl.
CPC .................... *H04L 67/10* (2013.01)

(58) Field of Classification Search
CPC ............................ H04L 67/00; H04L 67/1097
See application file for complete search history.

(56) References Cited

U.S. PATENT DOCUMENTS

| | | | |
|---|---|---|---|
| 5,574,878 A | 11/1996 | Onodera et al. | |
| 6,215,877 B1 * | 4/2001 | Matsumoto | H04L 9/0825 380/277 |
| 6,463,509 B1 | 10/2002 | Teoman et al. | |
| 7,130,917 B2 | 10/2006 | Zhang et al. | |
| 7,228,354 B2 | 6/2007 | Chambliss et al. | |
| 7,328,274 B2 | 2/2008 | Zhang et al. | |
| 7,895,261 B2 | 2/2011 | Jones et al. | |
| 8,103,787 B1 | 1/2012 | VanRenesse | |
| 8,250,197 B2 | 8/2012 | Gulati et al. | |
| 8,280,853 B1 | 10/2012 | Lai et al. | |
| 8,285,687 B2 | 10/2012 | Voll et al. | |
| 8,458,719 B2 | 6/2013 | Wellerdiek | |
| 8,565,243 B2 | 10/2013 | Little | |
| 2002/0059253 A1 | 5/2002 | Albazz et al. | |
| 2003/0002503 A1 * | 1/2003 | Brewer | H04L 47/122 370/392 |
| 2003/0046396 A1 | 3/2003 | Richter et al. | |

(Continued)

FOREIGN PATENT DOCUMENTS

| | | |
|---|---|---|
| EP | 2031807 | 3/2009 |
| WO | 2011/088261 | 7/2011 |

OTHER PUBLICATIONS

U.S. Appl. No. 14/212,023, filed Mar. 14, 2014, Marc John Brooker.

(Continued)

*Primary Examiner* — Michael A Keller
(74) *Attorney, Agent, or Firm* — Robert C. Kowert; Meyertons, Hood, Kivlin, Kowert & Goetzel, P.C.

(57) ABSTRACT

At a first client-side component of a storage service, a metric of a storage workload directed from the first client-side component towards server components of the storage service is determined. The metric is transmitted to a particular server component, which is configured to propagate the metric to a different client-side component of the storage service. The first client-side component receives, from a server component, a different metric of a storage workload of a second client-side component. The first client-side component reschedules at least one storage request based at least in part on the different metric.

20 Claims, 13 Drawing Sheets

(56) References Cited

U.S. PATENT DOCUMENTS

| | | |
|---|---|---|
| 2003/0191930 A1 | 10/2003 | Viljoen et al. |
| 2004/0078419 A1 | 4/2004 | Ferrari et al. |
| 2004/0111308 A1 | 6/2004 | Yakov |
| 2005/0007956 A1* | 1/2005 | Nilsson ............... H04L 12/1886 370/232 |
| 2005/0055694 A1 | 3/2005 | Lee |
| 2006/0167703 A1 | 7/2006 | Yakov |
| 2006/0288184 A1 | 12/2006 | Riska et al. |
| 2007/0079099 A1* | 4/2007 | Eguchi ................ G06F 3/0608 711/170 |
| 2007/0112723 A1 | 5/2007 | Alvarez et al. |
| 2007/0297328 A1 | 12/2007 | Semret et al. |
| 2008/0140905 A1 | 6/2008 | Okuyama |
| 2008/0189350 A1* | 8/2008 | Vasa ................... H04L 12/2602 709/201 |
| 2008/0189700 A1 | 8/2008 | Schmidt et al. |
| 2009/0228889 A1 | 9/2009 | Yoshida |
| 2009/0249470 A1 | 10/2009 | Litvin et al. |
| 2009/0254383 A1 | 10/2009 | Semret et al. |
| 2010/0037009 A1 | 2/2010 | Yano et al. |
| 2010/0070725 A1 | 3/2010 | Prahlad et al. |
| 2010/0076805 A1 | 3/2010 | Batsakis et al. |
| 2010/0191922 A1 | 7/2010 | Dickey et al. |
| 2010/0246538 A1* | 9/2010 | Kravtsov ............. H04W 72/06 370/336 |
| 2010/0312983 A1 | 12/2010 | Moon et al. |
| 2011/0138051 A1 | 6/2011 | Dawson et al. |
| 2011/0276763 A1* | 11/2011 | Daly ................... G06F 12/0888 711/122 |
| 2011/0320631 A1 | 12/2011 | Finkelstein |
| 2012/0054329 A1 | 3/2012 | Gulati et al. |
| 2012/0079132 A1* | 3/2012 | Liu ....................... H04L 1/0002 709/233 |
| 2012/0079221 A1 | 3/2012 | Sivasubramanian et al. |
| 2012/0131591 A1 | 5/2012 | Moorthi et al. |
| 2012/0254687 A1 | 10/2012 | Leggette et al. |
| 2012/0311576 A1 | 12/2012 | Shu et al. |
| 2012/0324446 A1 | 12/2012 | Fries et al. |
| 2012/0330954 A1 | 12/2012 | Sivasubramanian et al. |
| 2013/0046966 A1 | 2/2013 | Chu et al. |
| 2013/0054948 A1* | 2/2013 | Raj ..................... G06F 9/45558 713/2 |
| 2014/0050094 A1 | 2/2014 | Branch et al. |
| 2015/0254246 A1* | 9/2015 | Sheth ................ G06F 17/3053 707/728 |

OTHER PUBLICATIONS

AWS Documentation, "Amazon EBS API and Command Overview", downloaded Jul. 11, 2013, 1 page.
Amazon Web Services, "Amazon Elastic Block Store (EBS)", downloaded Jul. 11, 2013, pp. 1-4.
Amazon Web Services, "Feature Guide: Elastic Block Store", downloaded Jul. 11, 2013, pp. 1-7.
U.S. Appl. No. 14/028,186, filed Sep. 16, 2013, Marcin Piotr Kowalski.
U.S. Appl. No. 13/926,686, filed Jun. 25, 2013, Wei Xiao.
U.S. Appl. No. 13/926,697, filed Jun. 25, 2013, Wei Xiao.
VMware; Carl Waldspurger; Memory Resource Management in WMware ESX Server; pp. 1-24, Dec. 10, 2002.
HP; Chris Hyser et al.; Autonomic Virtual Machine Placement in the Data Center; pp. 1-10, Feb. 26, 2008; HP Laboratories.
U.S. Appl. No. 12/892,742, filed Sep. 28, 2010, Swaminathan Sivasubramanian.
U.S. Appl. No. 13/465,998, filed May 7, 2012, Marc J. Brooker.
U.S. Appl. No. 13/424,290, filed Mar. 19, 2012, Marc J. Brooker.
U.S. Appl. No. 13/466,007, filed May 7, 2012, Marc J. Brooker.
U.S. Appl. No. 13/466,010, filed May 7, 2012, Marc J. Brooker.
U.S. Appl. No. 13/466,014, filed May 7, 2012, Marc J. Brooker.
U.S. Appl. No. 13/466,022, filed May 7, 2012, Marc J. Brooker.
U.S. Appl. No. 13/926,684, filed Jun. 25, 2013, Wei Xiao, et al.
"AMI Basics" downloaded Jul. 11, 2013 from doc.aws.amazon.com/AWSEC2/latest/UserGuide/ComponentsAMIs.html, pp. 1-2.
U.S. Appl. No. 13/926,708, filed Jun. 25, 2013, Wei Xiao, et al.
"Cloudiquity" Published Mar. 12, 2009, Amazon Web Services and Cloud, pp. 1-4.
U.S. Appl. No. 13/926,694, filed Jun. 25, 2013, Stuart Henry Seelye Marshall et al.
U.S. Appl. No. 13/327,616, filed Dec. 15, 2012, Wei Xiao, et al.
U.S. Appl. No. 13/327,620, filed Dec. 15, 2012, Wei Xiao, et al.
U.S. Appl. No. 13/799,386, filed Mar. 13, 2013, Swaminathan Sivasubramanian et al.
U.S. Appl. No. 13/247,846, filed Sep. 28, 2011, Brian Helfrich et al.
U.S. Appl. No. 13/431,360, filed Mar. 27, 2012, David John Ward Jr.
U.S. Appl. No. 13/475,359, filed May 18, 2012, David John Ward Jr.
Office Action from Chinese Application No. 201580019702.7, dated Feb. 7, 2018, (English translation and Chinese Version), Amazon Technologies, Inc., pp. 1-15.

* cited by examiner

STORAGE WORKLOAD MANAGEMENT USING REDIRECTED MESSAGES

BACKGROUND

Several leading technology organizations are investing in building technologies that sell "software-as-a-service". Such services provide access to computing and/or storage resources (e.g., storage devices providing either a block-level device interface, or a web service interface) to clients or subscribers. Within multi-tier e-commerce systems, combinations of different types of resources may be allocated to subscribers and/or their applications, such as whole physical or virtual machines, CPUs, memory, network bandwidth, or I/O capacity. Block-level storage devices implemented at storage service may be made accessible, for example, from one or more physical or virtual machines implemented by another service.

Every system that provides services to clients needs to protect itself from a crushing load of service requests that could potentially overload the system. In general, a system is considered to be in an "overloaded" state if it is not able to provide the expected quality of service for some portion of client requests it receives. Common solutions applied by overloaded systems include denying service to clients or throttling a certain number of incoming requests until the systems get out of an overloaded state. Such techniques may for example be employed at storage servers in some embodiments on a per-storage-device level.

Some current systems avoid an overload scenario by comparing the request rate with a fixed global threshold and selectively refusing service to clients once this threshold has been crossed. However, it is difficult, if not impossible, to define a single global threshold that is meaningful (much less that provides acceptable performance) in a system that receives different types of requests at varying, unpredictable rates, and for which the amount of work required to satisfy the requests is also varying and unpredictable in at least some cases. While many services may have been designed to work best when client requests are uniformly distributed over time, in practice such temporal uniformity in work distribution is rarely encountered. Service providers that wish to achieve and retain high levels of customer satisfaction may need to implement techniques that deal with temporal and spatial workload variations in a more sophisticated manner.

Figure 1:
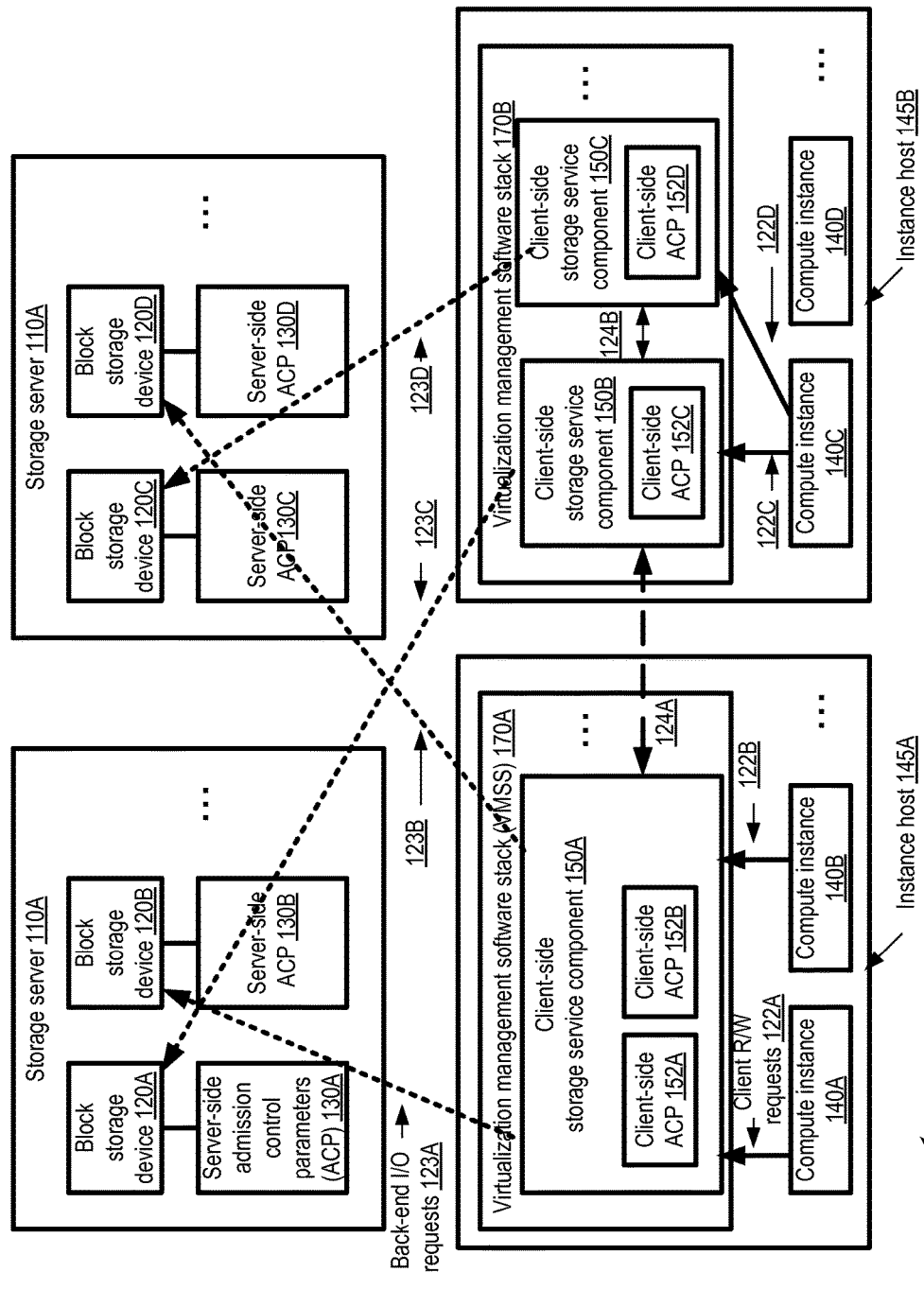
FIG. 1 illustrates a system in which a block-level storage service is implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for workload management at storage systems, including techniques involving coordinated admission control of network-accessible block storage devices and techniques involving redirected workload messages are described. The terms "admission control" and "throttling" may be used synonymously herein to represent operations performed to limit the rate at which received work requests (such as read or write requests directed to a storage service) are accepted for implementation, as opposed to, for example, being deferred or rejected. A set of software and/or hardware entities involved in performing admission control may collectively be referred to as "admission controllers". In at least some embodiments, the admission control techniques may be used at one or more components of a storage service implemented within a provider network environment. Networks set up by an entity such as a company or a public sector organization to provide one or more network-accessible services (such as various types of cloud-based database, computing or storage services) accessible via the Internet and/or other networks to a distributed set of clients may be termed provider networks herein. Some of the services may be used to build higher-level services: for example, computing, storage or database services may be used as building blocks for a content distribution service or a streaming data processing service.

At least some of the services of a provider network may be packaged for client use in service units called "instances": for example, a virtual machine instantiated by a virtualized computing service may represent a "compute instance". Computing devices at which such compute instances of the provider network are implemented may be referred to herein as "instance hosts" or more simply as "hosts" herein. A given instance host may comprise several compute instances, and the collection of compute instances at a particular instance host may be used to implement applications of one or more clients. Computing devices at which logical storage devices such as volumes (or portions of one or more volumes) of a network-accessible storage service are implemented, e.g., using some collection of disk-based storage hardware and associated software, may be referred to herein as "storage servers" A given storage server may host storage devices (or portions of storage devices) of one or more clients.

According to some embodiments, a block storage service of the provider network may enable clients to create or instantiate block storage devices, such as mountable block-level volumes that implement block device programmatic interfaces for I/O, and to programmatically attach one or more block storage devices to compute instances to support networked block-level I/O operations (as opposed to, for example, file-level I/O operations) from the instances. In one embodiment, for example, the block storage service may expose a "CreateVolume" application programmatic interface (API), enabling clients to specify a volume size, as well as various other parameters such as a provisioned throughput level to be supported by the block storage service (expressed in units such as block I/O operations per second). An "AttachVolume" API may be supported in such an embodiment to programmatically attach a specified volume (or a partition of a volume) to at least one specified compute instance with a specified device name. After a given volume implemented by the block storage service is attached to a compute instance, in some embodiments, the compute instance may interact with the volume just as it would interact with a local drive, e.g., formatting the volume with a file system and/or installing applications on the volume. Thus, the volumes provided by the block storage service may behave analogously to raw unformatted external hard drives from the perspective of the compute instances.

In some embodiments, one or more provider network services may be implemented using a layered architecture, comprising a front-end layer that interacts with service clients and a back-end layer comprising resources that are accessed by the front-end layer on behalf of the service clients. Such a layered approach may be used for various reasons, e.g., to implement desired levels of security or isolation for client data, to support implementation flexibility at the back-end, and so on. For example, a block storage service may comprise a back-end layer comprising numerous storage servers with physical storage devices such as disks, and a front-end layer running on the same instance hosts at which the compute instances on which client applications that utilize the block storage are implemented. The front-end layer, which may for example comprise components of a virtualization management software stack (such as one or more modules of an administrative operating system instance or a hypervisor), may intercept read and write requests of the applications and issue corresponding physical input/output (I/O) requests to the storage servers where the data being read or written is persistently stored. The storage servers at the back-end may also be referred to herein as "server-side" components (or server components) of the storage service, while the front-end components may be referred to herein as "client-side" components (or client components). In some embodiments, at least two types of communication channels may be established between the front-end layer and the back-end layer: "data-plane" communication channels and "control-plane" communication channels. Data-plane channels may be intended primarily for submitting storage requests from the front-end layer to the back-end layer and receiving responses to such requests. Control-plane communication channels may be intended primarily for administrative or configuration-related operations, including, for example, recovery-related operations, dynamic reconfigurations in response to changing workloads, and so on. For security and other reasons, the data-plane and control-plane channels may be implemented in at least some embodiments using respective sets of network links and devices, and/or using independently configured virtual networks. A data-plane communication channel may have to be established, for example, before the first storage request is transmitted from a client-side component of the front end to a storage server at the back end. In at least some embodiments, as described below, pre-existing data-plane communication channels may be used (e.g., using piggybacking techniques) for redirected workload-related information among sets of front-end components or among sets of back-end components, and the redirected workload-related information may then be used to schedule or reschedule service requests.

As noted earlier, in some embodiments clients may indicate various performance-related preferences or requirements for their block storage devices or volumes, e.g., at the time the block storage devices are created. A client may, for example, indicate the desired size of a volume, or a number of I/O operations per second (IOPS) that the volume should be configured to support. In some implementations, the block storage service may determine a maximum IOPS level to be supported, based on the volume size indicated by the client. According to at least some embodiments, the block storage service may support a provisioned workload model. In a provisioned workload model, a given object to which work requests may be directed (such as a volume or a partition of a volume) may be set up or configured in such a way that it is normally able to support up to a particular rate of work requests (a "provisioned throughput capacity") with acceptable response times for the work requests. The term "throughput capacity" is used herein to represent the ability of a resource to complete work requests (such as reads or writes in the case of a storage resource) at a given rate. Throughput capacity may be expressed in work operations per second, such as logical or physical IOPS in the case of storage resources. In order to support the provisioned workload model, any of various types of admission control techniques may be used, such as a technique in which available throughput capacity is modeled by the availability of work tokens within token buckets as described below. Other admission control techniques that do not utilize work tokens may be used in at least some embodiments.

In at least some embodiments, a non-provisioned workload model may also or instead be supported at a storage service. For example, one volume V1 may have a provisioned IOPS setting P1, while another volume V2 of the same storage service may not have a provisioned IOPS setting. In such an embodiment, the service may attempt to reserve or set aside resources for V1 that are estimated to be sufficient to meet the provisioned IOPS rate P1, and may simply implement best-effort scheduling for V2 without necessarily attempting to meet a pre-determined IOPS goal. In one embodiment, clients may be billed at different rates for provisioned volumes than for non-provisioned volumes—e.g., because a substantial set of resources may be pre-allocated for the provisioned volume, the billing rate may be higher for the provisioned volume than for the non-provisioned volume. The workload management techniques described herein may be applied for either type of workload model (provisioned or non-provisioned) in at least some embodiments.

In accordance with a provisioned workload model in use at a storage service, as indicated above, sufficient resources may be allocated for each block storage device to support a corresponding throughput level. For example, consider a client C1 with a compute instance CI1, to which block storage volumes V1 and V2 are to be attached. If the client requests (e.g., at the time of volume creation) a provisioned IOPS level (PIOPS) of P1 for volume V1, and a PIOPS of P2 for volume V2, the storage service may identify back-end storage servers with physical storage devices (and network devices) capable of supporting the desired I/O rates, as well as CPUs capable of handling the request processing for the desired I/O rates. Admission control mechanisms at the back-end servers may typically enforce the PIOPS limits for the volumes in some implementations. For example, for V1, a token bucket with a refill rate of P1 tokens per second may be established, from which one token is consumed every time an I/O request is accepted. Similarly, a token bucket with a refill rate of P2 tokens per second may be established for V2, from which one token is consumed every time an I/O request is accepted. If an I/O request is received at the back-end storage server and no tokens remain, the request may be queued or rejected. In some implementations, the admission control for different categories of work requests may be handled independently—e.g., different token buckets may be set up for reads than for writes.

Depending on the kinds of applications for which V1 and V2 are configured, variations in the I/O workloads directed at V1 and V2 may still occur over time, which may lead to higher I/O response times (or higher I/O rejection rates) than desired. If I/O operations are directed to V1 at a rate higher than P1 during a given time interval such as a second, for example, the admission controller may have to defer or reject some of the operations. In some situations, for at least some time intervals, the combined IOPS of the two volumes may remain below their combined provisioned rates, but the request rate for one of the volumes may exceed the provisioned limit for that volume. For example, if P1 and P2 are both 1000 IOPS, so that their combined PIOPS is 2000, during a given second the rate of I/O requests for V1 may be 1200 (above its provisioned level) and the rate of I/O requests directed to V2 may be 500 (below its provisioned level). In at least some embodiments, it may be possible to analyze the read and write request patterns at client-side components of the storage service (e.g., at the instance hosts where the applications run) and predict the variations in I/O request rates with a high degree of accuracy. In such embodiments, the client-side components may coordinate with the back-end storage servers to modify the admission control parameters that are used to accept work requests for the volumes at least temporarily as described below, so that request rates above the provisioned IOPS levels may be supported for some periods of time for one or more volumes if sufficient resources are available. In the above example, in an embodiment in which token buckets are being used for admission control, the client-side components may temporarily increase the refill rate for V1's bucket (e.g., to 1250 tokens per second, so that 1200 IOPS can be handled relatively easily) and decrease the refill rate of V2's bucket (e.g., to 750 tokens per second) if the storage server for V1 is capable of handling 1250 IOPs. Alternatively, instead of adjusting refill rates, some number of tokens may simply be "borrowed" or transferred from V2's bucket and deposited in V1's bucket. In this way, as long as sufficient resources are available, various types of temporary compensatory admission control parameter adjustments may be made to enhance the overall responsiveness of the storage service. A volume or device from which capacity is borrowed may be referred to as a "lender" or "donor" volume or device, while the one at which a higher-than-provisioned workload is expected may be referred to as a "borrower" or "recipient" volume or device. In some embodiments, it may be possible to borrow capacity from several different lender volumes V2, V3, . . . (each of which is expected to have lower-than-provisioned workload levels) to deal with V1's increased demand. In one embodiment, even if V1's increased demand can be fulfilled only partially (e.g., if the difference between V1's expected workload and provisioned rate is 200 IOPS, but only 100 IOPS can be borrowed collectively from V2, V3, . . . etc.), capacity may still be borrowed from one or more lender volumes to help manage V1's workload. To simplify the presentation, much of the following description focuses on scenarios involving a single lender volume, a single borrower volume, and a complete fulfillment of the extra demand at the borrower volume; however, in various embodiments, multiple lenders, multiple borrowers, and/or partial fulfillment may be supported as well.

In at least some embodiments, respective sets of admission control parameters (e.g., token bucket refill rates) may be established to implement respective rates of provisioned workloads for each of a plurality of block-level storage devices implemented at a multi-tenant storage service. A client-side component of the service may generate an estimate of a rate of work requests expected to be directed during some time period to at least a portion of a first block-level storage device implemented at a first storage server. If the expected rate of work requests to the first device exceeds the provisioned workload of the first device, the client-side component may attempt to identify a second block-level storage device (e.g., at a different storage server or at the same storage server) at which the workload expected during the time period is lower than the provisioned workload. If such a second device can be found, in at least some embodiments the client-side component may ascertain (e.g., by communicating with the first storage server) whether the first storage server has enough capacity to accept the extra workload of the first device. Since the storage servers may in many cases be multi-tenant (i.e., block storage devices may be implemented on the a given server on behalf of several different clients or instances, and each of the block devices may need to support a respective PIOPS rate), the storage server may not always be able to handle excess load above the PIOPS level. If the storage server can handle at least some of the increased load, the client-side component may initiate modifications of the admission control parameters to be applied to the first and second devices at least during the time period of interest, so that a higher workload than the provisioned level can be accepted for the first device, and the second device is restricted to a lower work request rate than its provisioned level. (In one embodiment, under some circumstances, e.g., if the expected workload level at the second device is substantially below the provisioned level for the second device, only the parameters pertaining to the first device may be modified.) After the time period ends, the admission control settings may be reset back to their original values in some embodiments. In some embodiments, admission control settings may be reset gradually over some reset time interval, e.g., in accordance with a decay function; in other embodiments, a step function may be used to change the value of an admission control setting instantaneously or close to instantaneously.

In many cases the borrower and lender devices may be owned by or assigned to the same client account or to linked client accounts, or may be otherwise logically associated (e.g., if they are being used for related applications). Thus, in at least some embodiments, when determining whether to "borrow" capacity of one device to support higher-than-provisioned workloads at another, the client-side component of the storage service may use metadata such as client account information, or information about the kinds of applications for which the devices are being used.

A similar technique may also be used in embodiments in which at least one of the devices involved does not have a provisioned IOPS setting—instead, for example, an internal workload rate target may be associated with each of the devices (e.g., based on measured workload trends), and capacity may be borrowed from the device that is expected to be less busy than the other and lent to the busier of the two. As mentioned earlier, in some embodiments in which the applications for which the block devices are being used run on compute instances at instance hosts of a computing service, the client-side component may be part of the virtualization management software stack at the instance hosts. In at least one embodiment, the client-side components may run at devices other than the instance hosts—e.g., at intermediary nodes of the storage service between the front-end instance hosts and the back-end storage servers.

In some embodiments, block-storage devices such as volumes may be partitioned or distributed across more than one back-end storage device or more than one back-end storage server. Such partitioning may be implemented, for example, to support very large volumes and/or very high throughput levels that cannot be easily accommodated at a single storage server or at a single storage device. A 20-terabyte volume may be divided into five 4-terabyte partitions in one example scenario, each of which may be stored using a set of disks at a respective storage server. In some embodiments in which partitioned volumes are supported, details of the partitioning, or even the fact that the volume is distributed among several partitions, may not necessarily be revealed to the client that requested the volume. From the perspective of the client, it may appear that a single volume with a single provisioned workload level is configured. The front-end and back-end components of the storage service may implement the partitioning, e.g., by determining how many partitions should be configured and at which storage servers/devices the partitions should be stored. The provisioned throughput capacity of the large "virtual" volume may be distributed among the partitions. For example, if the 20-terabyte volume has been provisioned (from the client's perspective) for 10000 IOPS, internally, each of the five 4-terabyte volumes may be configured for 2000 PIOPS. Admission control may be performed at the partition level in some such embodiments, e.g., in addition to or instead of at the volume level. Separate token buckets may be employed for each of the partitions in some implementations. If, in such an example scenario, the workload for one or more of the partitions is anticipated to rise above the 2000 IOPS level during some time period, and the workload for one or more other partitions is anticipated to be below the 2000 level, a client-side component of the storage service may adjust the PIOPS levels of the different partitions. To support the expected workload levels, e.g., the token refill rates of the partitions expected to be busier may be increased, while the token refill rates of the partitions expected to be less heavily used may be reduced. Thus, partition level "borrowing" and "lending" of throughput capacity may be performed in such embodiments, although similar admission control parameter adjustments may also be implemented at the volume level.

A block-level storage device such as a volume may be attachable only by a single compute instance in one embodiment, e.g., using an equivalent of the "AttachVolume" API mentioned earlier. In other embodiments, a single block-level device or partition may be attached from multiple compute instances, potentially instantiated at different instance hosts. In general, in various embodiments a given storage server or storage device may be accessed from M different client-side components, and conversely, a given client-side component of a storage service may be able to access N different storage servers.

In order to receive and respond to storage requests from client-side components in various embodiments, as noted above, data-plane communication channels may be established between client-side components of a storage service and back-end storage servers. In at least some embodiments, workload-related information that may be helpful in scheduling storage requests may be exchanged between cooperating client-side components using message redirection via back-end servers, e.g., over pre-existing data plane communication channels. Workload information received from other cooperating client-side components (e.g., piggybacked on data-plane messages that would have been sent anyway) may be collected with very low overhead at a given client-side component, and then used to improve storage request scheduling (or rescheduling) decisions locally. For example, a group of client-side components instantiated on behalf of a single end user customer (or a set of logically associated customers) of the storage service may collectively decide to use redirected messages to cooperate on workload management tasks such as attempting to prioritize some types of storage operations of the group over others, or attempting to impose some level of fairness with respect to storage resource usage among group members. Such a group of coordinating or cooperating client-side components may be referred to as a client-side "affiliation group" herein. In some embodiments, a group of coordinating back-end server components may also or instead use redirected messages to exchange workload information, and use such information to enhance the quality of their own back-end admission control decisions.

According to one embodiment in which such a redirection technique is used, a first client-side component C1 of a multi-tenant network-accessible storage service may determine a metric M1 of its (i.e., C1's) storage workload. Such a metric may, for example, be obtained by measuring, during a particular time interval, the rate at which storage requests were directed from C1 towards one or more storage servers. C1 may then transmit the metric M1 to a particular storage server S1 of the service back end via a pre-existing data-plane communication channel. The server S1 may identify one more different client-side components C2, C3, . . . , to which metric M1 should be directed, based on various parameters of a workload metric distribution policy. In at least some embodiments, the server S1 may receive guidance regarding the set of cooperating client-side components of an affiliation group among which workload-related information should be distributed, e.g., in the form of control-plane messages from the client-side components, or in the form of other data-plane messages, or in the same data-plane message in which M1 is transmitted by C1.

The storage server S1 may transmit the metric M1 to a selected second client-side component C2, e.g., using a different pre-existing data-plane communication channel created earlier between S1 and C2. At C2, M1 (as well as other metrics collected from other client-side components via similar redirected messages, and the metrics of C2 itself) may be used to make adjustments to C2's subsequent workload. For example, based on its view of the workload conditions at other client-side components with which C2 wishes to cooperate, C2 may reschedule or delay a submission of one or more storage requests (to S1 or to other servers). S1 may also transmit M1 to other client-side components based on the distribution policy. Similarly, C2 may transmit its own metric M2 to some server, using a pre-existing data-plane communication channel, and M2 may be disseminated via redirection to other client-side components of C1 and C2's affiliation group. Over some period of time (determined for example by the distribution policy), the different members of C1 and C2's affiliation group may all obtain relatively recent workload information from each other, and may thus be in a position to make more informed workload scheduling decisions.

It is noted that such a technique of sharing workload data among affiliation group members via redirection to improve, from at least the perspective of the group as a whole, the workload scheduling decisions of the group may be employed regardless of the admission control techniques being used. For example, in some embodiments, workload information may be shared via redirection and used for request scheduling purposes regardless of whether the storage service implements provisioned IOPS in the manner described earlier. In some embodiments, the techniques described earlier regarding a client-side component logically transferring I/O capacity units among storage servers, or temporarily modifying admission control parameters, may be combined with the redirection techniques. For example, a client-side component may still adjust admission control settings for storage servers based on expectations of server workload levels, while at the same time using workload information obtained from other cooperating client-side components to modify the scheduling of its own submitted service requests. In some embodiments, instead of or in addition to using the redirection technique, client-side components of the storage service located at different instance hosts may communicate directly with one another, e.g., sharing anticipated workload levels or other metadata. In one embodiment, the back-end storage servers may also or instead share workload information directly among themselves for admission control parameter modifications. In at least one embodiment, storage servers may continue to utilize admission control parameters to throttle workloads even if workload metrics are being used at client-side components to modify the client workloads cooperatively. Thus, in some embodiments, admission control decisions made at storage servers may in effect be used to override workload rescheduling attempts by client-side components.

In embodiments in which the storage servers are configured to redirect received workload information, a metric distribution policy comprising a number of different parameters may be used to guide the redirection process. Such parameters may govern, for example, (a) a timing of propagation of the metrics to other client-side components, (b) criteria to be used to select the client-side components to which the metrics should be sent, and/or (c) the number of client-side components to which the metrics are to be redirected. In some embodiments, destinations for the metrics may be chosen using random selection from among members of the affiliation group, e.g., in a manner similar to that used for information propagation in many "gossip"-based protocols. In at least some embodiments, the policy may indicate the mechanisms to be used to transmit the metrics on to the selected destinations: e.g., whether or under what conditions the metrics should be piggybacked on network messages that contain requested data blocks or responses to write requests, or whether the metrics should be sent in messages that do not contain a data storage payload or response. In one embodiment, for example, both the initial transmission of the metrics from the client-side component, and the retransmission of the metrics, may involve piggybacking the metrics on network messages that are generated for normal data-plane traffic.

In at least some embodiments, different members of a client-side component affiliation group may have different roles in the context of some application or set of applications, as a result of which the storage requests from some component C1 may be deemed to have greater importance than the storage requests of another component C2. For example, C1 may be submitting storage requests on behalf of a primary or master component of an application node cluster, while C1 may be submitting storage requests on behalf of a worker node of the cluster. In such scenarios, relative weights or priorities may be associated with the requests of different group members, and the weight information may be propagated among the group members so that request scheduling decisions can be made with the relative importance of different components in view.

Example System Environment

FIG. 1 illustrates a system in which a block-level storage service is implemented, according to at least some embodiments. As shown, a number of different block-storage devices 120 (such as entire volumes or partitions of volumes) may be configured at various back-end storage servers 110 to support read and write requests issued by applications running at various compute instances 140 in the depicted embodiment. For example, block storage devices 120A and 120B are located at storage server 110A, while block storage devices 120C and 120D are located at storage server 110B. Compute instances 140A and 140B are implemented at instance host 145A, while compute instances 140C and 140D run at instance host 145B.

Applications running on the compute instances 140 issue read and/or write requests 122 (also referred to herein as client read/write requests) for storage objects (such as files or file systems) that are implemented using block storage devices 120. The application read/write requests 122 at a given instance host 145 may be trapped or intercepted at local client-side components 150 of the storage service at the instance host, and the client-side component 150 may issue the corresponding back-end I/O requests 123 to the storage servers. Thus, the client-side components may be considered intermediaries between the compute instances and the storage devices that are logically attached to the compute instances in such embodiments. The back-end I/O requests may be considered analogous to translations of the client read/write requests. For example, client read/write requests 122A from compute instances 140A and 140B are translated to back-end I/O requests 123A and 123B by client-side storage service component 150A at instance host 145A. Similarly, client read/write requests 122C and 122D from compute instance 140C at instance host 145B are handled by local client-side components 150B and 150C respectively.

It is noted that at least in some implementations, a given client read or write request 122 may not necessarily result in a corresponding back-end I/O request 123; instead, in such implementations, some client read/write requests may be consolidated with others or split into smaller requests by the client-side components 150, so that the number of back-end I/O requests may not exactly match the client read/write requests. The client-side components may be responsible for combining and/or splitting read/write requests in some embodiments, and may also perform caching or other operations. The client-side components 150 may each comprise one or more processes or threads of execution in some implementations. In some embodiments, a single client-side component 150 may be instantiated at a given instance host 145, and such a monolithic client-side component 150 may be responsible for handling read and write requests for several different compute instances and/or for several different block storage devices attached to the instances. In other embodiments, a separate client-side component 150 may be responsible for handling block storage requests for a given compute instance, or for a given attached block storage device. In the depicted embodiment, the client-side components 150 are incorporated within virtualization management software stacks 170 (e.g., at special operating system instances dedicated to administrative operations rather than to client applications, or at hypervisors) at their instance hosts 145: e.g., client-side component 150A is a subcomponent of virtualization management software stack (VMSS) 170A at instance host 145A, while client-side components 150B and 150C are part of virtualization management software stack 170B at instance host 145B. In other embodiments, client-side components of the block storage service may not be implemented at the virtualization management software stacks; instead, for example, they may be implemented at the compute instances 140, or in some cases at routing intermediaries that accept write requests from the virtualization management software stacks and redirect the requests to the storage servers.

In the embodiment shown in FIG. 1, each block storage device 120 has a corresponding set of server-side admission control parameters (ACP) 130 that are used by the storage servers to determine whether to accept, delay or reject incoming back-end I/O requests 123, e.g., in accordance with a provisioned workload model of the kind described above. Thus, server-side admission control parameters 130A, 130B, 130C and 130D apply to block storage devices 120A, 120B, 120C and 120D respectively. In addition, the client-side components 150 may also maintain a set of client-side admission control parameters 152 for the various block storage devices 120, such as client-side admission control parameters 152A, 152B, 152C and 152D for block storage devices 120A, 120B, 120C, and 120D respectively. Under normal operating conditions, e.g., when the actual read/write request rates can be handled by back-end I/O requests at or below the provisioned IOPS, the client-side admission control parameters may not differ from the server-side admission control parameters in at least some embodiments. Under some types of operating conditions in which higher rates of work requests are expected to be directed to one or more block devices 120, the admission control parameters at either the instance hosts, the storage servers, or at both the instance hosts and the storage servers, may be modified as described below. In some implementations, for example, the client-side components may modify their local admission control parameters 152 temporarily for some set of storage devices 120, and then override the admission control parameters 130 being used for those storage devices to match the changed client-side parameters to enable higher-than-provisioned workload levels.

The client-side components 150 may monitor the temporal and/or spatial distribution of the client read/write requests, and may be able to estimate future request rates, at least for short periods of time, based on an analysis of the monitoring results. At least in some embodiments, the client-side components 150 may be able to anticipate contrasting trends in workload patterns across multiple block devices or partitions (e.g., increases in the workload at one volume coinciding at least approximately in time with decreases in the workload of another volume) more easily than the storage servers. This may be the case, for example, because a given storage server may typically not be in the request/response path for work requests pertaining to devices located at other servers, while a given client-side component may have visibility into the work requests for multiple back-end storage devices. In some embodiments, the client-side components 150 located at the same instance host 145, or at different instance hosts, may exchange workload information or other metadata that may be used to make admission control decisions, as indicated by arrow 124A. Similarly, in at least one embodiment, some set of storage servers 110 may also exchange workload information or other metadata. In some embodiments, workload information received from one client-side component at a storage server may be redirected to other client-side components, as discussed below in the context of FIG. 8, or workload information received from one storage server at a client-side component may be relayed to another storage server.

In the embodiment shown in FIG. 1, if a given client-side component 150 estimates that, for some block device 120, the anticipated request rates may require an I/O rate higher than the provisioned level during a time interval, the client-side component may attempt to find some other block device from which throughput capacity can be "borrowed" to accommodate the anticipated higher request rates. In some embodiments, in order to make admission control parameter modifications to handle such surges or bursts in request rates, a client-side component 150 may need to verify (a) that some block device can accept a temporary reduction in maximum accepted request rates and (b) that the storage server at which the increased request rate limit has enough capacity to accept the increase. If these conditions can be met, the client-side admission control parameters for the affected devices may be modified in the depicted embodiment, typically in such a way that the combined allowed request rate for the set of affected block devices remains at or below the sum of their provisioned workload levels, but temporary surges or bursts can be handled at the busier devices. In embodiments in which work tokens are used to represent available throughput capacity, for example, the refill rates of the token bucket of the device at which the extra requests are expected may be raised, while the refill rate of the token bucket at which demand is expected to be low may be reduced.

Figure 4:
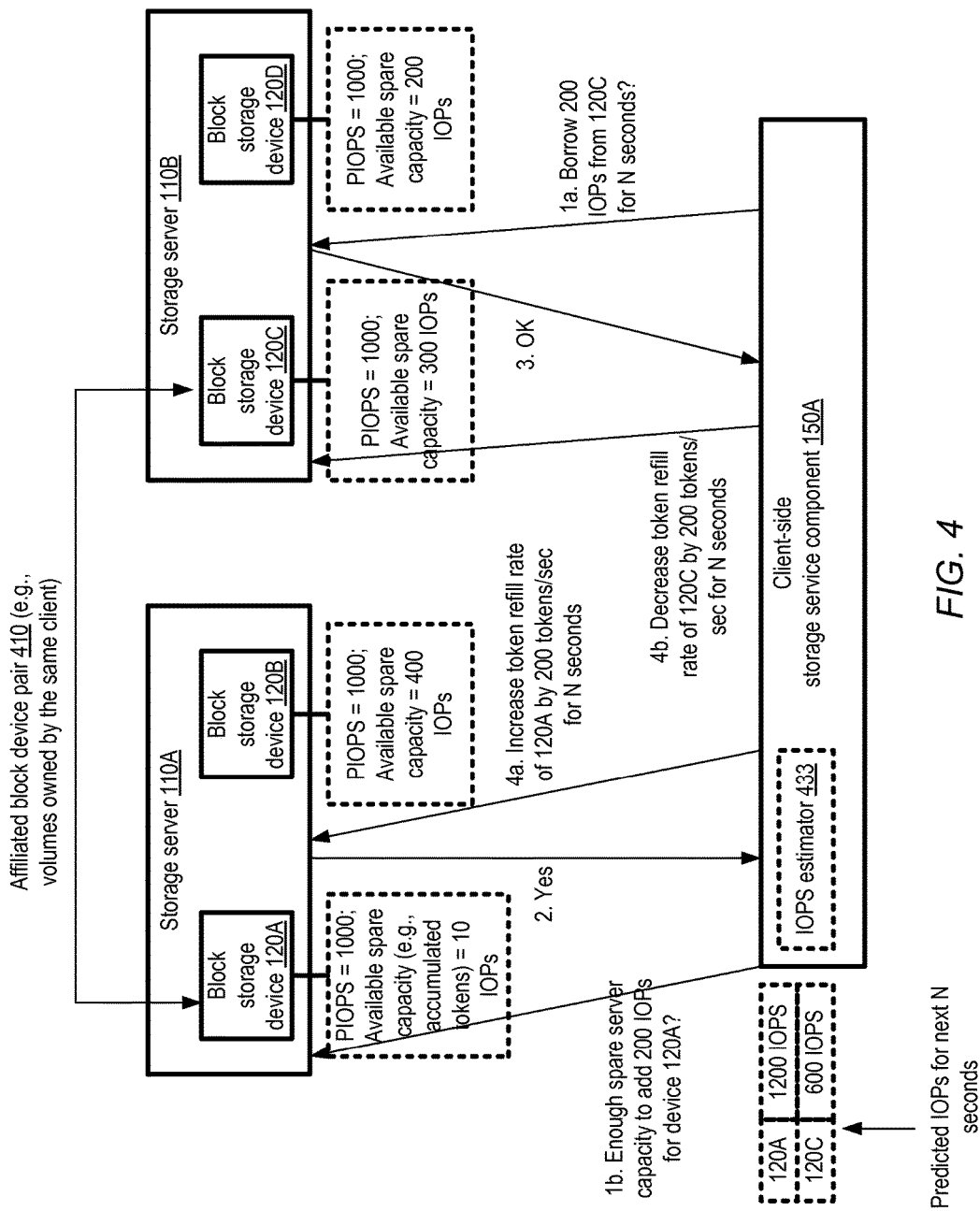
FIG. 4 illustrates example admission control interactions between back-end storage servers of a service and client-side components of the service, according to at least some embodiments.

In some embodiments, spare or excess capacity from several different block devices may be borrowed to compensate for increasing the rate of work requests accepted at a busy block device. For example, in the embodiment illustrated FIG. 1, a large increase in the I/O request acceptance rate at device 120A may be compensated for by decreasing the maximum acceptance rates at devices 120B, 120C and 120D. A more detailed example of the application of such compensatory techniques is illustrated in FIG. 4 and described below. The modifications made to client-side admission control parameters may temporarily override the corresponding server-side admission control parameters in some implementations. In some embodiments, a single set of admission control parameters modifiable by the client-side components may be maintained, either at the instance hosts 145 or at the storage servers 110, instead of separate sets of server-side and client-side parameters.

Admission Control Using Token Buckets

Figure 2:
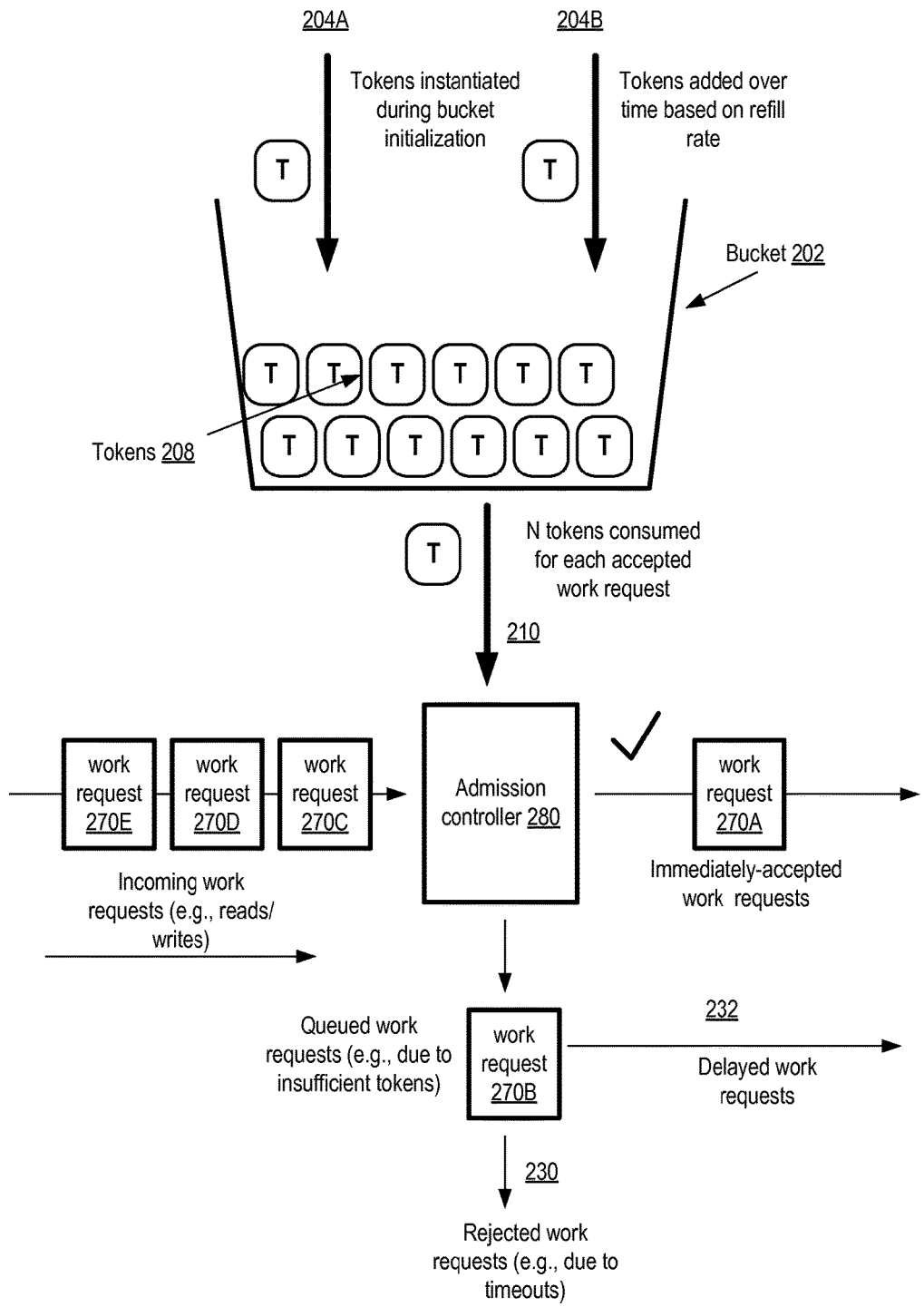
FIG. 2 illustrates aspects of an admission control mechanism that utilizes work token buckets to schedule operations, according to at least some embodiments.

Any of various admission control techniques may be implemented in different embodiments to ensure that clients' provisioned workloads for storage operations are handled with reasonable responsiveness. FIG. 2 illustrates aspects of an admission control mechanism that utilizes work token buckets to schedule operations, according to at least some embodiments. Generally speaking, such mechanisms may be used for workload management of various types of entities, such as storage objects, database tables, database partitions, and the like. In the context of a block storage service, such buckets may be maintained for various volumes or volume partitions by one or more admission controllers 280, at either the instance hosts 145, the storage servers 110, or both the instance hosts and the storage servers in various embodiments. A mechanism that uses a single bucket 202 of tokens is illustrated in FIG. 2 for simplicity of presentation; however, combinations of multiple buckets may be used in some embodiments, such as one bucket for read operations and a different bucket for write operations. According to the mechanism, a bucket 202 (e.g., a logical container which may be implemented as a data structure within a software program in at least some embodiments) set up for admission control purposes associated with a particular work target 102 such as a block-level storage device (e.g., a volume, or a portion of a volume) may be populated with an initial set of tokens 208 during bucket initialization, as indicated via arrow 204A. The initial population may be determined, e.g., based on expectations of the workload, service level agreements, a provisioning budget specified by the client that owns or manages the corresponding data object, or some combination of such factors in various embodiments. For some types of buckets the initial population may be set to zero in some embodiments. In some implementations the initial population of a bucket may be set to a maximum population for which the bucket is configured.

When an indication of a new work request 270 (such as a read request or a write request in the case of a storage object or database object) is received at an admission controller 280, the admission controller may attempt to determine whether some number N of tokens (where N may be greater than or equal to 1, depending on implementation or on configuration parameters) are present in the bucket 202 in the depicted embodiment. If that number of tokens is available in the bucket, the work request 270 may be accepted or admitted for execution immediately, and the tokens may be consumed or removed from the bucket (arrow 210). Otherwise, if N tokens are not present, the acceptance of the work request 270 may be deferred until sufficient tokens become available in the depicted embodiment. In the illustrated scenario, work request 270A has been accepted, work request 270B has been deferred, and work requests 270C, 270D and 270E are yet to be considered by the admission controller 280. The deferred request may eventually be accepted, as indicated by arrow 232, e.g., when sufficient tokens eventually become available in bucket 202. In some embodiments, if a particular work request does not get accepted within some timeout window, it may be rejected by the admission controller, as indicated by arrow 230. Rejected work requests may be resubmitted or retried in some implementations. In at least some embodiments, if sufficient tokens are not available in the bucket 202 when the work request is processed by the admission controller 280, the work request may be rejected immediately instead of being deferred.

As shown by the arrow labeled 204B, the bucket 202 may be refilled or repopulated over time, e.g., based on configuration parameters such as a refill rate associated with the bucket, as described below with reference to FIG. 3. In some implementations, token refill operations may accompany, or be performed in close time proximity to, consumption operations—e.g., within a single software routine, N tokens may be consumed for admitting a request, and M tokens may be added based on the refill rate and the time elapsed since the bucket was last refilled. Refill rates or token counts of a given bucket may be modified by the client-side components 150 of a storage service, e.g., to allow higher work request rates to be handled, typically for short time intervals. Limits may be placed on the maximum number of tokens a bucket may hold in some embodiments, and/or on the minimum number of tokens, e.g., using configuration parameters. Using various combinations of configuration parameter settings, fairly sophisticated admission control schemes may be implemented in different embodiments.

In one simple example scenario, to support a steady load of 100 work requests per second, bucket 202 of FIG. 2 may be configured with an initial population of 100 tokens, a maximum allowable population of 100 tokens and a minimum of zero tokens; N may be set to 1, and the refill rate may be set to 100 tokens per second, and one token may be added for refill purposes (assuming the maximum population limit is not exceeded) once every 10 milliseconds. As work requests 270 arrive, one token may be consumed for each work request. If a steady state workload at 100 work requests per second, uniformly distributed during each second, is applied, the refill rate and the workload arrival rate may balance each other. Such a steady-state workload may be sustained indefinitely in some embodiments, given the bucket parameters listed above.

If, extending the above example, the arrival rate and/or the refill rate is not uniform, scenarios may arise in which the bucket 202 remains empty for some (typically small) time intervals (e.g., if some set of work requests in rapid succession consume more tokens than the refill mechanism is able to replace). In such a case, an arriving work request may have to be rejected (or retried after a delay). In order to deal with temporal non-uniformity of workloads without introducing substantial delays or high rejection rates, various techniques may be employed in different embodiments, such as the temporary modifications of admission control parameters by client-side components 150 described earlier.

Figure 3:
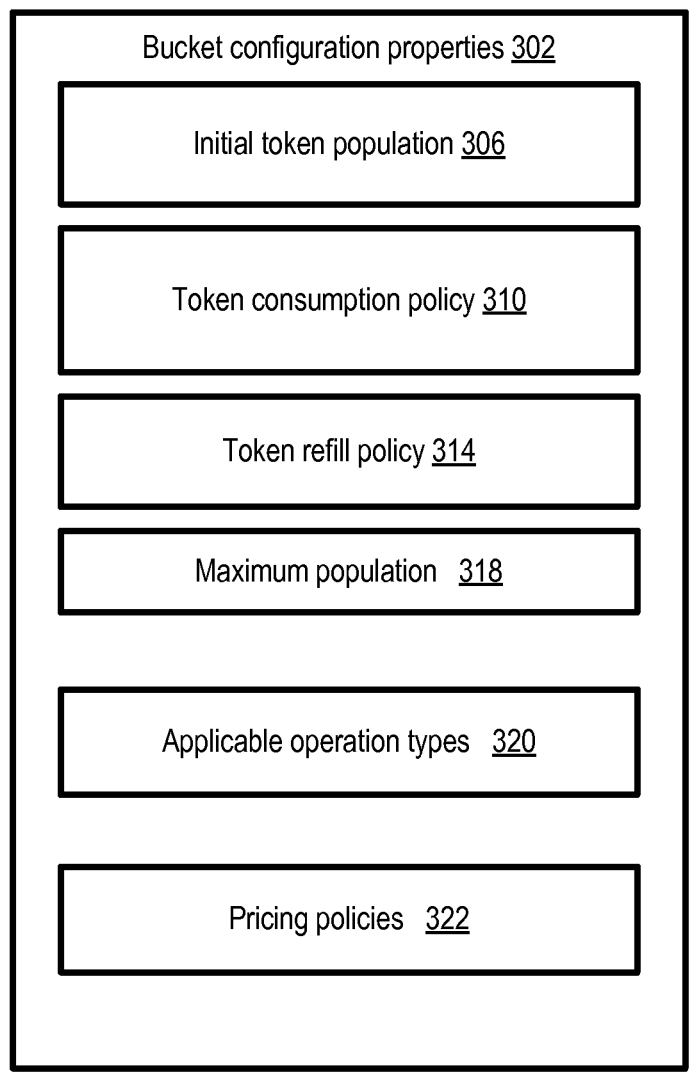
FIG. 3 illustrates example configuration properties of a token bucket, which may be used for implementing various types of admission control policies, according to at least some embodiments.

FIG. 3 illustrates example configuration properties 302 of a token bucket, such as bucket 202, which may be used for implementing various types of admission control policies, according to at least some embodiments. In some implementations, the token bucket may be implemented as an in-memory data structure of the admission controller 280, and may be written to persistent storage as needed. Such a data structure may comprise fields representing the current token population, when the population was last modified, and/or values for various parameters and policies indicated in FIG. 3.

A token consumption policy 310 may indicate how tokens are to be consumed for admission control, and the timing of the consumption (e.g., whether all the tokens are to be consumed prior to accepting a work request, or whether some tokens may be consumed later based on the actual amount of work performed for the accepted request). In some embodiments different numbers of tokens may be consumed for different types of operations from a given bucket based on its consumption policy—e.g., I/O operations may be classified as "large" or "small", and different amounts of tokens may be consumed based on the size of the I/O operation. In some embodiments, a token consumption policy may also specify a decay-during-idle parameter indicating whether (and at what rate) tokens are to be deleted from the bucket if the corresponding work target is not targeted for work requests for some time, or a transfer-upon-idle parameter indicating whether tokens should be transferred from one bucket to another (e.g., from a bucket of a lightly-used volume to a bucket of a more heavily-used volume) if they are not used during some time interval. In one embodiment, a staleness policy may be used to consume tokens that have not been consumed for a specified time interval—e.g., each token may be associated with a validity lifetime after which the token may no longer be useful for admission control purposes.

Properties 302 may include an initial token population parameter 306 in the depicted embodiment, which indicates how many tokens are to be placed in the bucket at startup or initialization. Token refill policy parameter 314 may indicate at what rate, and/or under what circumstances, tokens are to be added to the bucket, e.g., to help sustain a rate of work for which the work target associated with the bucket has been configured. As discussed earlier, one or more of the parameters of the bucket may be changed over time—e.g., a default refill rate may apply to the bucket, but in order to accommodate higher-than-provisioned rates, a higher non-default rate may be used at least temporarily. Maximum population parameter 318 may indicate the maximum capacity of the bucket and the corresponding work target. In some embodiments, different types of operations may have different admission control rules (e.g., reads may have different rules than writes, or I/Os may have different rules based on the amount of data read or written) and the types of operations for which the bucket is to be used may be specified in applicable operation types parameter 320. In at least some embodiments, one or more pricing policies 322 that may be used to determine the amounts that clients are to be charged for the use of the bucket's tokens may be indicated in the bucket properties. In different embodiments, only a subset of the example parameters shown in FIG. 3 may be employed, while in other embodiments, additional bucket configuration parameters beyond those shown in FIG. 3 may be used. Values and/or settings for various properties shown in FIG. 3, as well as other admission control settings may be programmatically set or modified (e.g., by the client-side components 150 using web service calls) in at least some embodiments. It is noted that admission control techniques that do not utilize work tokens may be employed in at least some embodiments.

Admission Control Interactions Between Storage Servers and Client-Side Components FIG. 4 illustrates example admission control related interactions between back-end storage servers of a service and client-side components of the service, according to at least some embodiments. A total of four example block storage devices are shown, each with a PIOPS rate of 1000. Storage server 110A comprises block storage devices 120A and 120B, while storage server 110B comprises block storage devices 120C and 120D. Block device 120A and 120C may be considered an affiliated pair 410—e.g., because they are owned by the same client, or because they represent different partitions of a single virtual volume. Respective token buckets may be used for admission control for each device in the depicted embodiment. When considering whether to make admission control parameter modifications to enable higher I/O rates at a given device 120, in at least some embodiments a client-side component 150 may preferentially examine the expected workloads at affiliated devices 120 in its attempt to identify sources of capacity that can be borrowed.

Client-side storage service component 150 includes an IOPS estimator 433. The estimator may collect storage workload-related metrics from a variety of sources, including, for example, logs of read/write requests handled at the client-side component on behalf of one or more compute instances to which the devices 120 are attached, information collected from other client-side components at other instance hosts or the same instance host, and/or information collected from the storage servers 110. Using the collected data, the estimator 433 may be able to detect temporal and/or spatial patterns in the read and write requests issued from various compute instances, and may be able to use the patterns to make at least short-term predictions regarding future read/write rates and/or back-end I/O rates. In the example shown in FIG. 4, the estimator 433 has predicted that over the next N seconds, 1200 IOPS are to be expected at device 120A, and 600 IOPS are to be expected at device 120C. Accordingly, in order to enable the 1200 IOPS predicted for device 120A (with PIOPS 1000), the client-side component 150 may attempt to find other devices 120 that can contribute or "lend" (at least) 200 IOPS of their capacity to device 120A. In addition, the client-side component 150 may also need to verify that the storage server 110A at which devices 120A is located has enough spare capacity to be able to handle the extra load directed at device 120A.

As shown by the arrow labeled "1a", the client-side component may send a query to storage server 110B (e.g., to an admission controller component of the storage server 110B) to determine whether 200 IOPS can be borrowed from device 120C (which is affiliated with the device 120A at which the extra capacity is required) for the next N seconds. (In some implementations, slightly more than 200 IOPS may be requested, in order to be able to handle 200 extra IOPS without hitting a limit.) At about the same time in the depicted embodiment, as indicated by the arrow labeled "1b", the client-side component may send a different query to storage server 110A to determine whether the storage server has enough capacity to handle 200 more IOPS than are provisioned for device 120A. In some implementations, the two queries indicated by arrows 1a and 1b may be sent in parallel, while in other embodiments the client-side component may wait to receive the response to one of the queries before submitting the other; in the latter scenario, the queries may be submitted in either order. In some embodiments, the queries may be sent (and their responses received) via control-plane channels, while in other embodiments, data-plane channels may be used.

The storage servers 110A and 110B may examine their local workload metrics and/or admission control metadata to respond to the query. In some embodiments, for example, the storage server 110A may determine the average request rate for each of its block devices over the last M seconds, and if the sum of the average request rates is less than the sum of the provisioned rates for the block devices by an adequate amount, the storage server may respond affirmatively to the query 1b (as indicated by the arrow labeled "2"). In embodiments in which a token bucket mechanism is used for admission control for each of the block devices 120, the current population of accumulated or unused tokens for various buckets, which may indicate spare throughput capacity, may be examined in order to respond to the queries. For example, at storage server 110B, the token bucket for block device 120C may indicate an available spare capacity of 300 IOPS, so an affirmative answer to the request for 200 IOPS may be provided (as indicated by the arrow labeled "3"). The responses to the queries 1a and 1b may be received in any order; the labels "2" and "3" are not intended to imply that the responses need to be received in that order. In some embodiments, storage server 110B may examine the workload status of other devices before responding affirmatively to a request to borrow capacity—e.g., if the number of tokens in device 120's bucket is very low, the storage server 110B may respond negatively to the request 1a, on the conservative assumption that tokens should only be lent if all the block devices at the storage server are reasonably under-loaded with respect to their provisioned IOPS.

If the client-side component is able to find a donor block device, and if the storage server at which the extra capacity is requested is able to handle the corresponding load, one or more admission control parameters may be modified to allow the expected surge in requests to be accepted for execution. As indicated by the arrow labeled "4a", in the depicted example, the refill rate of the token bucket used for device 120A may be increased temporarily by 200 tokens/second, and the refill rate may be decreased by the same amount for device 120C as indicated by the arrow labeled "4b". The operations corresponding to arrows "4a" and "4b" may be performed in any order or in parallel. In some embodiments, parameters or settings other than token refill rates may be changed—e.g., 200*N tokens may simply be added to the token bucket used for device 120A in some embodiments, and 200*N tokens may be subtracted from the token bucket for device 120C. After the N-second period has elapsed, the parameters may be reset to their original values in at least some embodiments. Such resets of the admission control parameters may, for example, help prevent starvation or unfairness scenarios in which some block devices may otherwise be able to sustain higher request rates than their provisioned rates for long time periods, while other devices are prevented from achieving exceeding their provisioned rates.

It is noted that at least in some embodiments, it may not always be possible to obtain as much capacity for a given block device as necessary in order to handle the entire expected workload. For example, a given block device's provisioned workload level may be exceeded by 50%, but at most half of the 50% deficit may be overcome using capacity borrowed from other devices. In some embodiments, under such circumstances, the admission controllers of the storage service (e.g., at the client-side components) may be configured to implement a "best-effort" approach, according to which as much spare capacity as is available may be deployed for the overloaded block device, even if the entire workload cannot be handled without queuing or deferral. In other embodiments, the admission control parameters may be adjusted only of the entire expected capacity deficit for a given device can be met using capacity borrowed from other devices.

Admission Control for Partitioned Volumes

Figure 5:
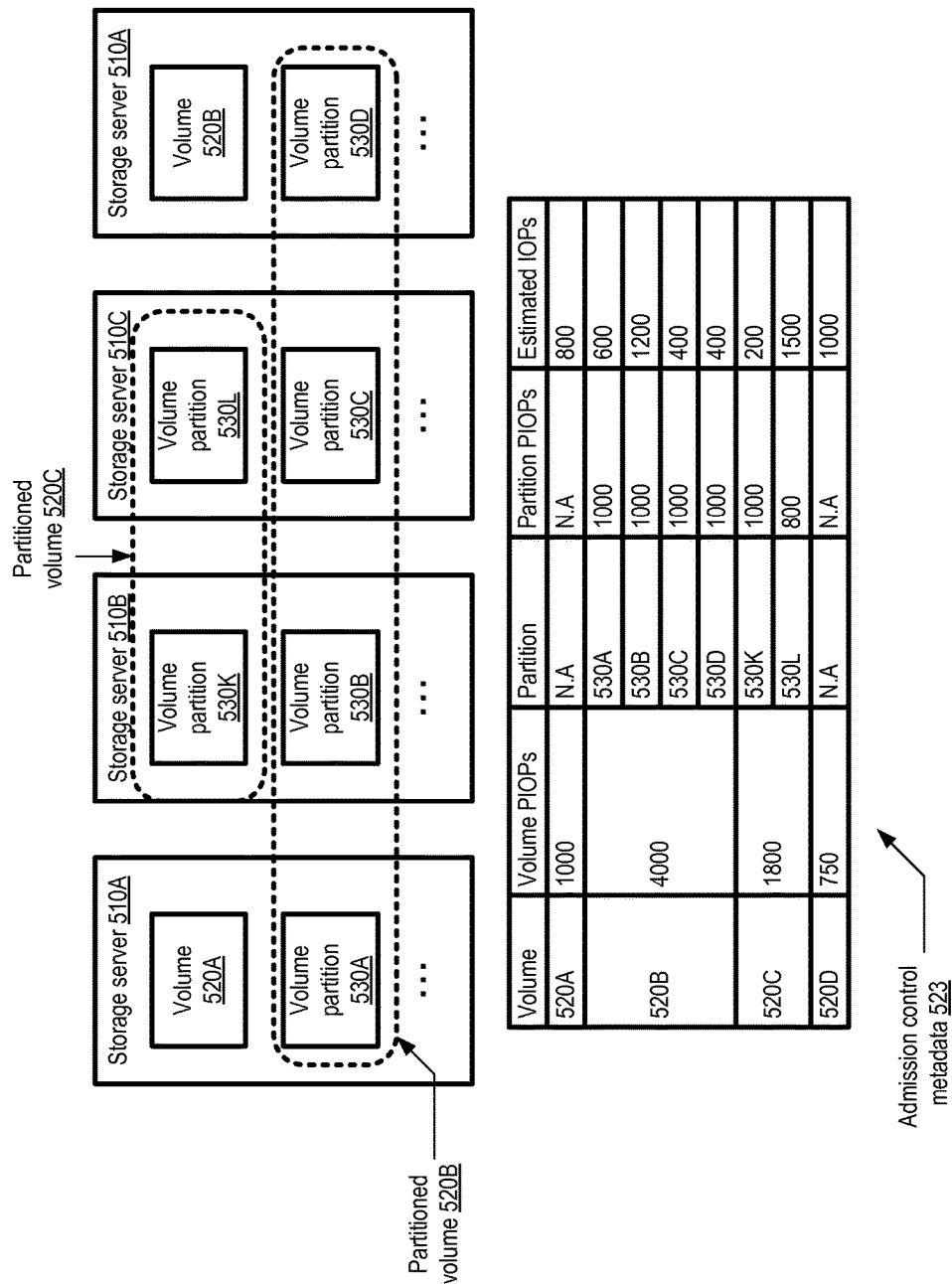
FIG. 5 illustrates examples of admission control metadata that may be used for virtual volumes comprising a plurality of partitions, according to at least some embodiments.

In at least some embodiments, as indicated earlier, virtual volumes that are partitioned across multiple storage servers or multiple physical devices may be implemented by the storage service. FIG. 5 illustrates examples of admission control metadata that may be used for virtual volumes comprising a plurality of partitions, according to at least some embodiments. As shown, four block-level volumes are implemented using four back-end storage servers 520. Two of the volumes—520B and 520C—are partitioned across multiple storage servers, while the remaining two volumes 520A and 520D are each confined to one storage server.

The fact that volumes 520B and 520C are physically distributed among multiple storage servers 510 may not be apparent to the clients on whose behalf the volumes are established in the depicted embodiment. Such volumes may therefore be referred to as virtual or virtualized volumes. The client for whom volume 520B is set up may simply have requested a volume that can support 4000 PIOPS (as indicated in the "Volume PIOPS" column of admission control metadata 523). In response to such a request, the storage service may have made the decision to split the volume into four partitions 530A, 530B, 530C and 530D at respective storage servers 510A, 510B, 510C and 510D. Similarly, the client on whose behalf volume 520C is set up may have requested an 1800 PIOPS volume, and the storage service may have made the determination to split the corresponding volume into partitions 530K and 530L at storage servers 510B and 510C respectively. For lower PIOPS levels, such as the 1000 PIOPS requested for volume 520A or the 750 PIOPS requested for volume 520D, multiple partitions may not be required. In some embodiments, volumes may be partitioned based on factors other than provisioned workload levels—e.g., requested volume size may be used to determine whether multiple partitions are needed or not. Externally, from the perspective of the client, a volume may be treated the same way regardless of its PIOPS level or size. Internally, the storage service may distribute the contents of some volumes (but not necessarily all volumes) among different devices and servers to attain the high total provisioned work request rates requested and/or to achieve the large volume size requested.

In the depicted embodiment, PIOPS settings are maintained as part of the admission control metadata 523 at both the overall volume level (as shown in the "Volume PIOPS" column) and the partition level (as shown in the "Partition PIOPS" column). The sum of the partition PIOPS of a given volume may (at least under normal operating conditions) add up to the PIOPS setting for that volume as a whole. In addition to the PIOPS settings, the storage service's admission controllers (e.g., at client-side components 150) may also estimate the IOPS expected during forthcoming time intervals, as indicated by the "Estimated IOPS" column. When the predicted IOPS for a given partition exceeds the provisioned IOPS, in at least some embodiments the differences between PIOPS and estimated IOPS at other partitions of the same volume may be examined in order to determine whether some of the provisioned capacity can be transferred to meet the increased demands. For example, with respect to partition 530B in the example shown in FIG. 5, the estimated IOPS exceeds the provisioned IOPS by 200. Accordingly, the client-side component responsible for partition 530B may examine the expected IOPS of the remaining partitions of volume 520B. Each of the remaining partitions 530A, 530C and 530D is expected to sustain a much lower rate of I/O operations than the provisioned level, and as a consequence any one (or any combination) of the remaining partitions may be selected in the depicted embodiment as candidates from which capacity is borrowed to sustain the 200 extra IOPS expected at partition 530B. Similarly, to obtain extra capacity for partition 530L, its peer partition 530K may initially be selected as a candidate. If none of the partitions of the same volume has sufficient spare capacity, other partitions or other volumes may be chosen as candidates in at least some embodiments.

Admission Control for Multiply-Attached Volumes

Figure 6:
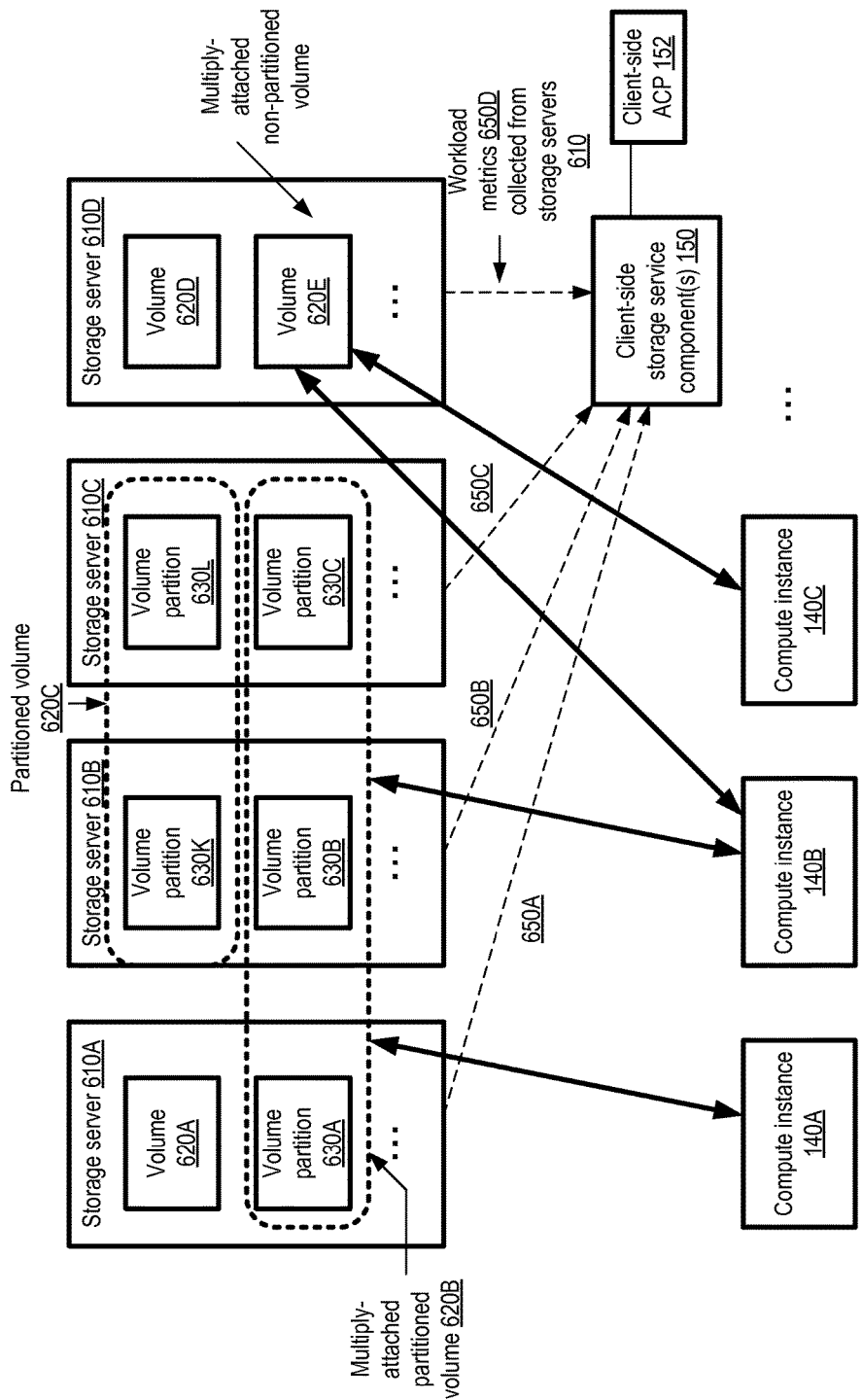
FIG. 6 illustrates examples of admission control-related operations for block-level devices that are attachable to multiple compute instances, according to at least some embodiments.

In some embodiments, a given block storage device such as a volume may be attached to at most one compute instance at a time, and hence may be accessed from at most one compute instance at a time. In other embodiments, a given volume or partition may be attached to (and hence accessible from) multiple compute instances concurrently. FIG. 6 illustrates examples of admission control-related operations for block-level devices that are attachable to multiple compute instances, according to at least some embodiments. Four storage servers 610A, 610B, 610C and 610D are shown. Two partitioned volumes 620B and 620C are illustrated, with three and two partitions respectively, while three non-partitioned volumes 620A, 620D and 620E are shown. In some embodiments in which partitioned volumes are supported, non-partitioned volumes may simply be managed as volumes that each comprise a single partition. Both partitioned and non-partitioned volumes may be attached to multiple compute instances in the depicted embodiment, e.g., as a result of various "AttachVolume" API calls. Partitioned volume 620B is attached to compute instances 140A and 140B, while non-partitioned volume 620E is attached to compute instances 140B and 140C. A given compute instance such as 140B may be attached to more than one multiply-attached volume (such as 620B and 620E) in at least some embodiments.

The ability to attach a given volume partition or volume to several different compute instances, each of which could potentially be executing at a different instance host 145, may complicate the prediction logic that is employed at client-side components of the storage service to make admission control parameter adjustments. In an embodiment in which at most one instance is attached to a given volume, the client-side component at the instance host of the currently-attached instance may be able to gather workload metrics pertinent to the I/O request rate at the volume relatively easily. However, when the same volume or partition can be accessed from different instances, for potentially different applications, collecting and analyzing the request patterns may not be as easy. In some embodiments in which multiple attachments are supported, the client-side components of the different instance hosts involved (i.e., the different instance hosts at which the concurrently-attached instances are running) may exchange workload information for each of the attached instances. In other embodiments, as indicated by the arrows 650A, 650B, 650C and 650D, the storage servers 610 involved in implementing the multiply-attached volumes may serve as conduits of workload information to be used for admission control decisions at the client-side components. For example, a storage server such as 610D may provide I/O metrics of multiply-attached volume 620E to client-side component 150A, or storage server 610B may provide I/O metrics of multiply-attached volume partition 630A to client-side component 150A. In some embodiments, the storage servers may be able to isolate the workload metrics for different compute instances that are attached to the same volume or partition, and provide the metrics organized by instance to the client-side components. Such an approach may help to improve the accuracy of the predictions made by the client-side component 150, and may accordingly enhance the effectiveness of its admission control parameter modifications.

Methods for Client-Side Coordinated Admission Control

Figure 7:
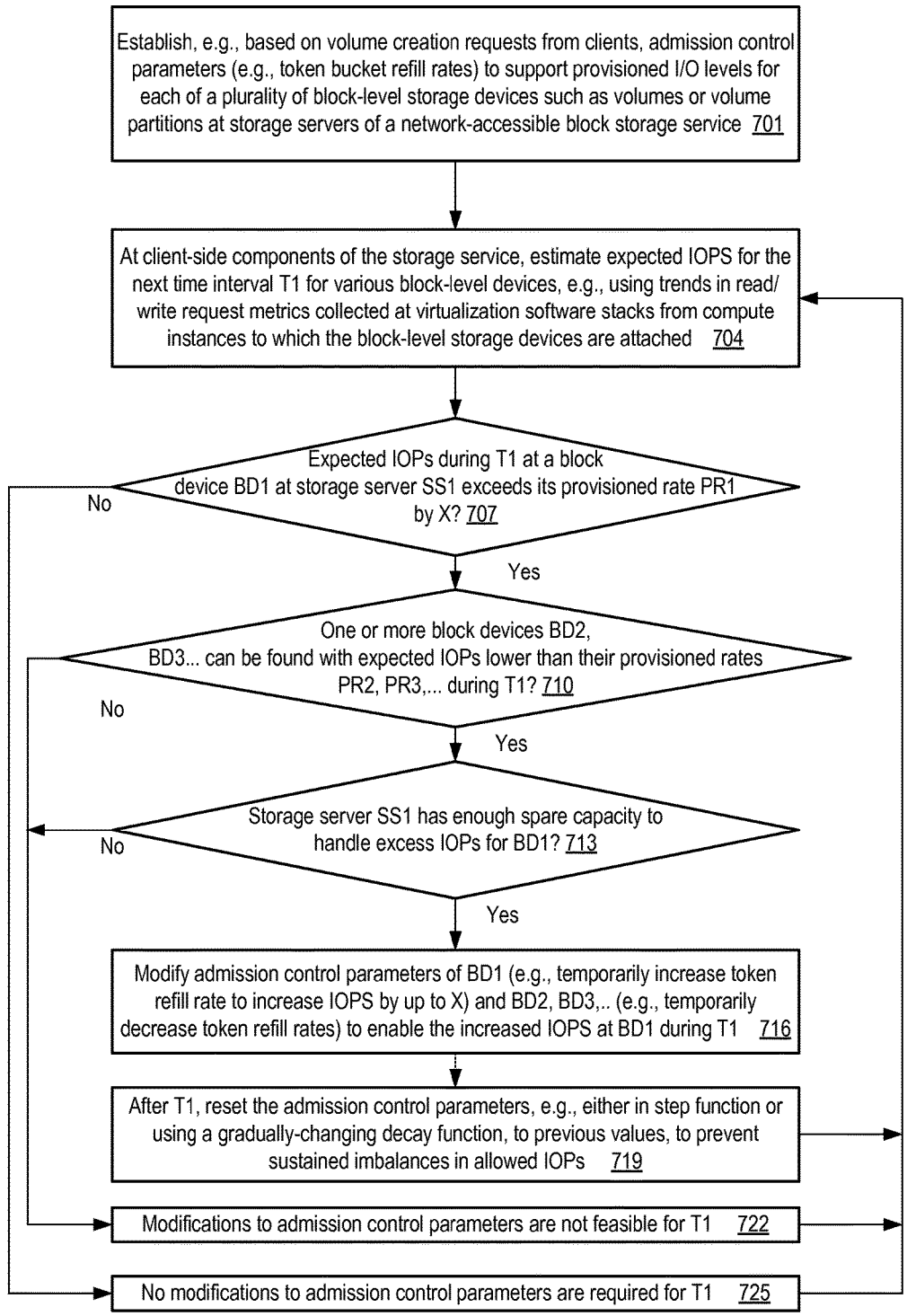
FIG. 7 is a flow diagram illustrating aspects of operations that may be performed to implement admission control for block-level storage devices, according to at least some embodiments.

FIG. 7 is a flow diagram illustrating aspects of operations that may be performed to implement admission control for block-level storage devices, according to at least some embodiments. As shown in element 701, admission control parameters may be established for each of several block-level storage devices of a storage service implementing a provisioned workload model. In embodiments in which token buckets (similar to bucket 202 of FIG. 2) are used to represent available capacity, for example, such parameters may include the refill rates of the token buckets used for a given volume or partition, the initial token populations, maximum and/or minimum token populations, and so on. Each set of admission control parameter settings may be selected, for example, based on client-specified preferences or requirements such as volume size and/or workload parameters indicated in the corresponding volume creation requests. In some embodiments in which partitioned volumes are supported, the client requirements may be used to determine how many different partitions are to be set up, and to identify the storage servers at which the partitions are to reside. The parameters may be used, e.g., by admission controller modules at either at the storage servers, the client-side components of the storage service, or both the storage servers and the client-side components to accept, defer or reject work requests such as read or write operations issued from applications executing at compute instances.

As shown in element 704, client-side components of the storage service may be configured to estimate expected workload levels (such as IOPS) at various block storage devices. Such estimates may in some implementations be generated for (or assumed to be valid for) relatively short time periods such as a few seconds or a few hundred milliseconds, and may be based for example on collected metrics that indicate patterns in the distribution of read and write requests. Metrics may be collected, for example, at the virtualization management software stacks of the instance hosts at which the compute instances attached to the block-level devices are run. The virtualization management software stacks may act as intermediaries for I/O requests issued from applications running at the compute instances in at least some embodiments, and may translate the application read/write requests into back-end I/O requests directed to the storage servers.

The estimates valid for a time interval T1 may be compared to the corresponding provisioned rates. If all the expected I/O rates are at or below the corresponding provisioned rates (as detected in element 707), no adjustments may be required to admission control parameters for the time interval T1 (element 725), and the client-side component may collect metrics to be used for estimates for subsequent time intervals. If at least one block storage device BD1 (at a storage server SS1) is expected to receive I/O requests at a rate that is X IOPS higher than its provisioned I/O rate PR1 (as also detected in element 707), the client-side component may proceed to determine whether some other block device BD2 is expected to receive I/O requests at a rate lower than BD2's provisioned IOPS rate PR2 (or if a group of such potential lender block devices BD2, BD3, . . . can be found, each expected to receive requests at respective lower-than-provisioned rates PR2, PR3, . . . ) (element 710). It is noted that although the client-side component may attempt to find enough spare capacity to match or even exceed the expected excess workload of BD1, in some cases it may only be possible to find enough lender devices to fulfill just a portion of BD1's excess workload. In order to find such lender devices, in at least some embodiments the client-side component may first examine the workload estimates for block devices affiliated with BD1—e.g., devices that are owned by the same client, or that are partitions of the same larger virtual volume as BD1. In some implementations the client-side component at a given instance host may communicate with other client-side components at other instance hosts (e.g., members of a client-side affiliation group as described below), or with storage servers, to determine whether such a device BD2 can be found.

If no such second device BD2 can be found, it may not be feasible to change admission control parameters to achieve the desired IOPS rate of (PR1+X) at BD1 (element 722) during T1. If, however, such a device BD2 (or group of devices BD2, BD3, . . . ) is found (as also detected in element 710), the client-side component may perform an additional check. A query may be directed to the storage server SS1 at which BD1 is located (element 713), to determine whether SS1 has enough capacity to manage at least some of the additional load expected at BD1 during T1. It may be the case that SS1 is supporting several busy block storage devices for other clients (or the same client) and may not have enough available throughput capacity to accept the increased workload. In such a scenario, SS1 may indicate to the client-side component that it cannot handle the excess workload, and the client-side component may accordingly conclude that admission control parameter changes are not feasible to accommodate the extra workload expected at BD1 during T1 (element 722).

If SS1 can handle the extra IOPS (as also detected in element 713), admission control parameter settings may be modified at BD1 (element 716) to enable at least some of the higher workload to be accepted. For example, in embodiments in which token buckets are used for admission control, the refill rate may be increased, or up to X tokens may be added to the bucket for BD1. In at least some embodiments, a corresponding compensatory change may be made to the admission control parameters at BD2, BD3, . . . —e.g., the refill rates may be reduced at their token buckets, or some tokens may be removed from their token buckets. Based on the modified parameters, BD1 may accept the extra requests during T1. Meanwhile, during T1, the maximum rate of requests accepted at BD2, BD3, . . . may be lowered below their provisioned levels. In at least some embodiments, the changes to the admission control parameters may be undone after the time period T1 (element 719), e.g., either gradually in accordance with a decay function, or near-instantaneously in accordance with a step function. Changes to admission control parameters may only be supported for relatively short time periods T1 in some embodiments, e.g., in order to provide devices other than BD1 to successfully increase their own throughput capacity if needed. After the period T1 has elapsed, operations corresponding to elements 704 onwards may be repeated for the next time interval.

As noted earlier, the techniques of adjusting admission control parameters by the client-side components based on estimates of expected workload may also be used in embodiments in which the provisioned workload model is not used. For example, internal workload rate targets for forthcoming time intervals may be associated non-provisioned volumes in some embodiments, and the types of temporary capacity transfers described above may be implemented on the basis of the internal workload rate targets instead of using provisioned IOPS rates.

Workload Information Dissemination Via Redirection

Figure 8:
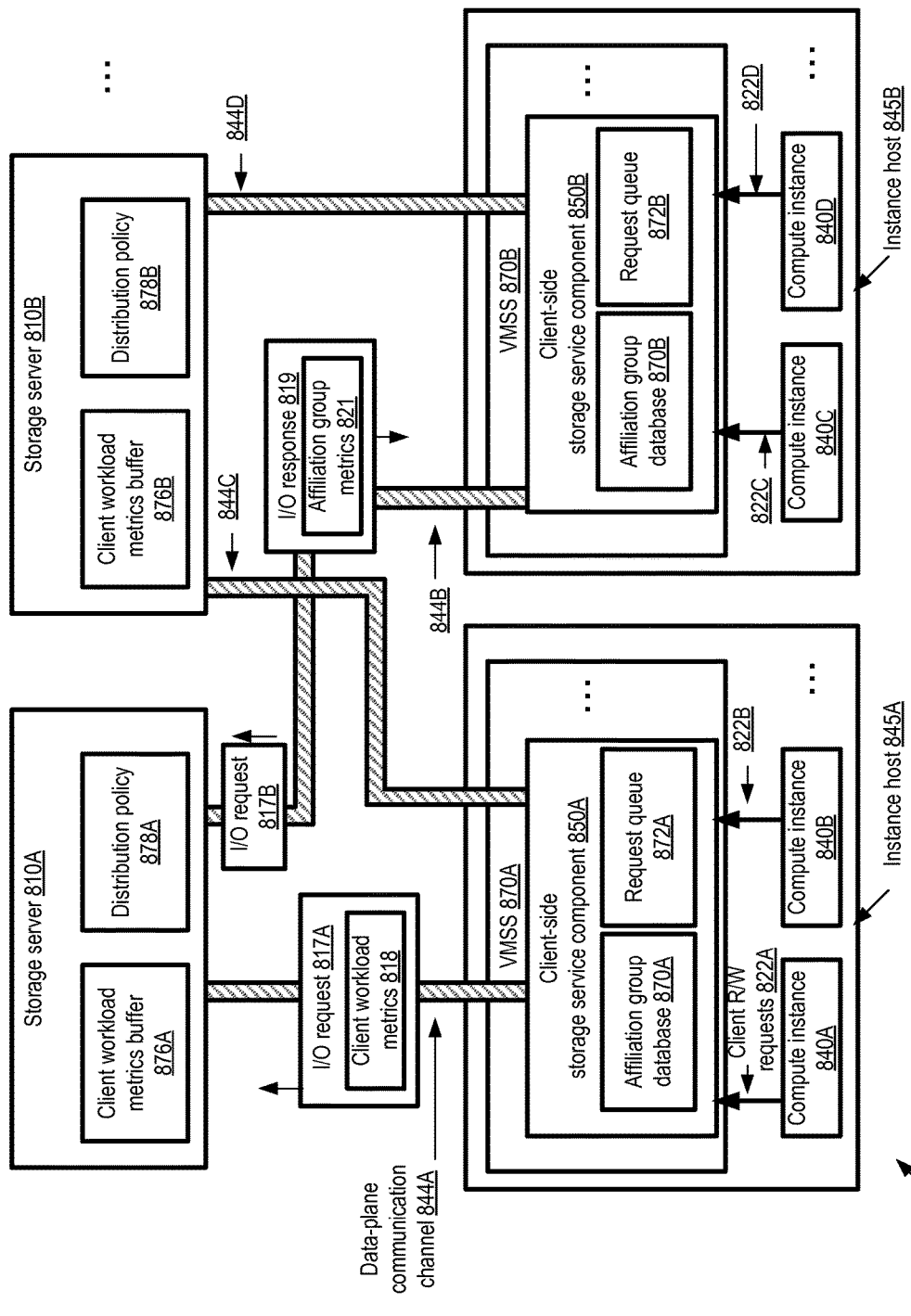
FIG. 8 illustrates a system in which workload-related messages between client-side components of a storage service may be redirected by server-side components, according to at least some embodiments.

FIG. 8 illustrates a system in which workload-related messages between client-side components of a storage service may be redirected by server-side components, according to at least some embodiments. As shown, system 800 may include a plurality of back-end servers 810 of a multi-tenant storage service, such as servers 810A and 810B, responsible for responding to I/O requests 817 (e.g., 817A and 817B) from a plurality of client-side components 850 of the service, such as 850A and 850B. In the depicted embodiment, the client-side components 850 may each be implemented within a respective virtualization management software stack (VMSS) 870 at an instance host of a virtualized computing service. For example, client-side component 850A may comprise one or more modules of VMSS 870A at instance host 845A, while client-side component 850B may be implemented within VMSS 870B of instance host 845B. The client-side components may submit the I/O requests to the storage servers 810 on behalf of read or write requests 822 (e.g., 822A, 822B, 822C and 822D) originally generated at applications running on compute instances 840, such as compute instances 840A and 840B of instance host 845A and compute instances 840C and 840D of instance host 845B. Although a single client-side component 850 is shown at each instance host of FIG. 8, in various embodiments multiple client-side components may be implemented at the same instance host. The storage service may implement programmatic interfaces at the block-device or volume level in some embodiments, although other interfaces such as file system APIs may also or instead be implemented in different embodiments. In at least one embodiment, admission control techniques similar to the token-based approaches illustrated in FIG. 2 may be used in system 800 as well. In one embodiment the storage service may support provisioned IOPS as described earlier in the context of FIG. 4, although the message redirection-based workload management approach may also be employed in embodiments in which the provisioned workload model is not used.

In the embodiment depicted in FIG. 8, data-plane communication channels 844 may have been established between each of the various storage servers and some subset of the client-side components. As indicated earlier, data-plane communication pathways may be established primarily for traffic comprising data read or written on behalf of applications at compute instances 840 (as well as requests for such reads and writes), while control-plane communication pathways (not shown in FIG. 8) may be used primarily for administrative or configuration purposes. For example, I/O requests from client-side component 850A to server 810A may be transmitted (and the corresponding responses received) via data-plane communication channel 844A; while I/O requests from client-side component 850A to server 810B may be transmitted (and the corresponding responses received) via data-plane communication channel 844C. Similarly, data-plane communication channels 844B and 844D may be used for client-side component 850B's data-related interactions with servers 810A and 810B respectively. It is noted that in at least some embodiments, not all the back-end storage servers 810 may have data-plane (or control-plane) communication channels established to all the client-side components 850. Thus, at least in some embodiments, various subsets of client-side components may have communication channels set up to various subsets of storage servers.

Some number of client-side components 850 of a storage service may be configured as intermediaries for storage or I/O requests on behalf of a single application, or a related set of applications. For example, a large distributed processing application involving dozens or hundreds of compute instances 845 may be run on behalf of the same end user client account of the storage service, or a set of interacting applications may be executed on behalf of one or more user accounts using a plurality of compute instances. For some such applications, a given storage volume or back-end device may be configured to be accessible from multiple client-side components (in a manner similar to that shown in FIG. 6). In some embodiments in which partitioned volumes similar to those illustrated in FIG. 5 are used, several client-side components may participate in the request-response pathway for a single partitioned volume set up for an application. Multiple client-side components may thus be involved in the I/O performed on behalf of some applications or application groups in a variety of configurations. From the end user client perspective and/or the application perspective, cooperative scheduling and/or admission control of back-end requests by the plurality of client-side components involved, ideally based on shared workload information regarding the various elements of the application(s), may be beneficial. Accordingly, in at least some embodiments, various groups of client-side components may be identified for sharing workload information within the respective groups, and for using the shared workload information to make more informed workload scheduling decisions. Such groups may be referred to herein as client-side affiliation groups. In the depicted embodiment, client-side components 850A and 850B are assumed to be members of the same affiliation group. Membership in an affiliation group may be determined based on any of several different factors in various embodiments, such as the use of shared resources among the members of the group, common client account ownership of the set of compute instances or instance hosts involved, access to partitioned volumes or multiply-attached shared volumes, locality or proximity of the resources used for the groups, and so on.

In the embodiment shown in FIG. 8, workload information may be sent from the client-side components 850 to the storage servers 810 using pre-existing data-plane communication channels, and then redirected from the storage servers to other client-side components of the originating component's affiliation group based on a set of parameters of a distribution policy. Thus, for example, client workload metrics 818 may be included within a back-end I/O request 817A sent from component 850A to server 810A. A number of different kinds of workload metrics may be transmitted in different embodiments. Metrics 818 may, for example, indicate the number or rate of read requests and/or write requests issued by the client component 850A over the previous X seconds, the number or rate of requests received from various compute instances 840 by the client component 850A over the last X seconds, latency or response time measurements for back-end requests issued by the client component 850A, CPU utilization, local disk utilization or network utilization metrics of the instance host 840A, and so on. In some embodiments, expected/estimated metrics for future time intervals may be transmitted instead, or in addition to, metrics that have already been measured.

At server 810A, the metrics 818 may be saved at least temporarily to a buffer 876A or to a database. In some implementations, older metrics from the same client-side component 850 may be overwritten in buffer 876 based on a retention policy as described below. In accordance with the distribution policy 878A, the server 810A may identify one or more other client-side components, such as 850B, to which the metrics from 850A (and/or from other members of the affiliation group) should be propagated. In the depicted embodiment, the metrics may be transmitted from server 810A to client-side component 850B in a response 819 to an I/O request 817B. In some embodiments, metrics 821 for more than one member of the affiliation group may be transmitted in a single message, while in other embodiments, metrics of a single client-side component may be transmitted per message.

At a selected destination client-side component 850B, the received metrics 821 may be saved in an affiliation group database 870B. Database 870B may include, for example, workload metrics of various other members of the affiliation group, relative priorities or weights attached to various members, how recently the workload metrics for any given member were obtained, and so on. On the basis of the received metrics 821 and/or on additional metadata in repository 870B, the client-side component 850B may make scheduling decisions for subsequent back-end service requests, e.g., by queuing up some selected requests within request queue 872B if it determines that it should reduce the workload directed to one or more back-end servers in view of high request rates from other affiliation group members. Component 850B's workload metrics may in turn be sent to one or more servers 810, such as 810B or 810A, and may be redirected to other components of the affiliation group. Thus, component 850A may receive metrics associated with 850B and other affiliation group members from some combination of servers 810, and may save that information within its own database 870A. Client-side component 850A may use the collected workload information to modify its own workload directed to one or more back-end servers 810, e.g., by placing some requests in request queue 872A temporarily. Each storage server may maintain its own buffer 876 of client metrics, such as buffer 876B at server 810B, and may redistribute the metrics to some set of client-side components in accordance with the applicable distribution policy (such as policy 878B at server 810B). The contents of buffers 876 at different storage servers 810 at any given point in time may differ from each other. In at least some embodiments the distribution policy parameters used by various servers 810 may also differ from one another—e.g., the scheduling policy for workload metric messages at server 810B may be different at a given point in time from the scheduling policy being used at that time at server 810A.

Client-side workload information may be propagated to various cooperating client-side components over time in the depicted embodiment. If, as shown in FIG. 8, the workload metrics are piggybacked on requests and responses that would have been sent in any case, the overhead associated with workload information sharing may be minimized in at least some embodiments. Furthermore, in at least some implementations, as the overall rate of service requests of an affiliation group increases, workload information may be propagated more frequently, since more back-end I/O requests and responses may be available per unit time for piggybacking purposes. As a result, the average delay between the measurement of a workload metric at a given client-side component and the time at which that workload metric is received by other client-side components may be reduced. Thus, the workload scheduling decisions at various client-side components may be made using more recent metrics in such implementations than if the overall workload level of the storage service were lower. The quality of the scheduling decisions made on the basis of shared workload metrics may accordingly improve with rising overall workload levels.

As noted earlier, storage servers 810 may continue to utilize admission control parameters to throttle workloads, independently of the techniques being used at client-side components in some embodiments. In such scenarios, decisions to reject or delay requests made on the basis of admission control settings at the storage servers may have the effect of overriding workload rescheduling decisions by client-side components. For example, on the basis of workload metric sharing of the kind described above, a particular client-side component C1 may attempt to schedule N back-end requests per second during some interval to a given storage server S1. If S1's admission control parameters (e.g., in combination with workload directed to S1 from other client-side components) do not permit that level of workload, some of C1's requests may be rejected by S1 despite C1's efforts to manage workload levels in the context of C1's affiliation group.

Metrics Distribution Policies

Figure 9:
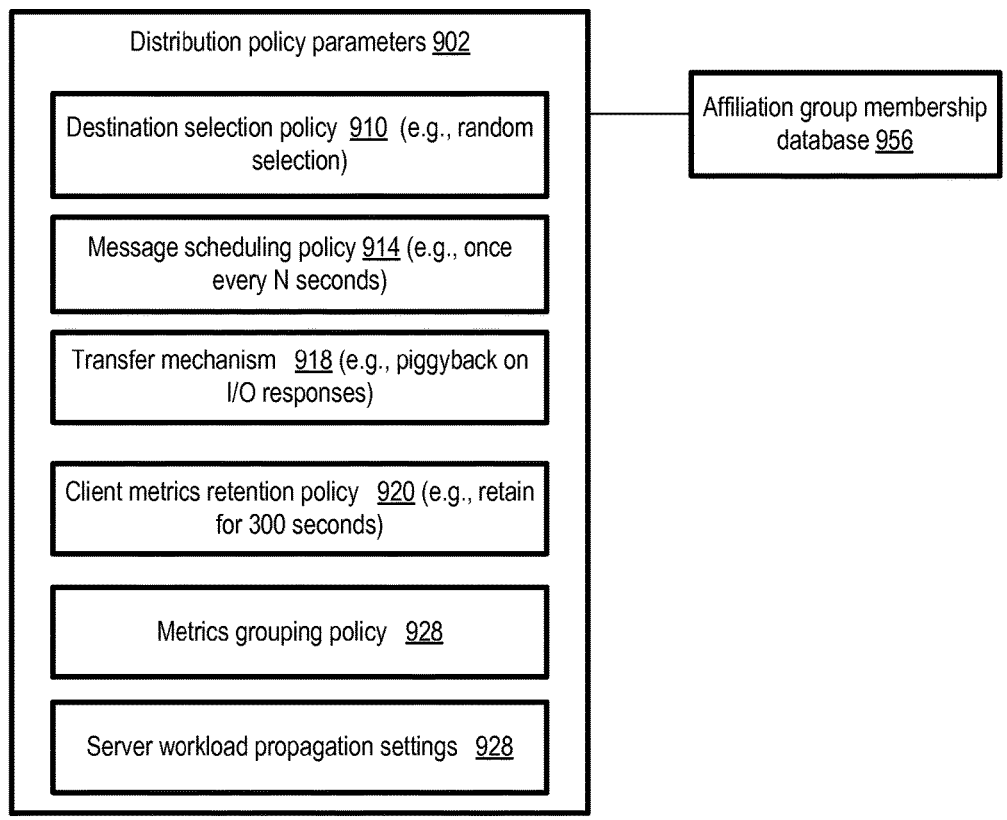
FIG. 9 illustrates example parameters of a distribution policy that may be used to redirect workload-related messages, according to at least some embodiments.

Several aspects of the manner in which the workload metrics received by the storage servers are propagated may be controllable via configurable parameters in various embodiments. FIG. 9 illustrates example parameters of a distribution policy that may be used to redirect workload-related messages, according to at least some embodiments. As shown, distribution policy parameters 902 to be applied for affiliation group members identified in a database 956 at a storage server 810 may include, among others, destination selection policy 910, message scheduling policy 914, transfer mechanism 918, client metrics retention policy 920, metrics grouping policy 924, and/or server workload propagation settings 928.

The storage servers responsible for redirecting client-side component workload metrics may be provided affiliation group membership information for inclusion in database 956 (e.g., to which affiliation group or groups, if any, various client-side components 850 belong) using any of several different approaches in various embodiments. In one embodiment, a given client-side component C1 may send a server S1 a list of other client-side components C2, C3, . . . , with which C1 wishes to cooperate, either via a control-plane message or via a data-plane message. The server S1 may be configured to confirm the membership, e.g., either on the basis of respective messages received from the other members, or by querying each proposed member C2, C3, . . . as to whether that component wishes to participate in workload metrics sharing with C1. Such confirmation-related messages may be transmitted or exchanged using control-plane pathways in some embodiments, or data-plane pathways in other embodiments. In some embodiments, the client-side components may periodically re-confirm their memberships in affiliation groups via messages to the storage servers. In one embodiment, storage servers may exchange affiliation group membership information with other storage servers, e.g., either using direct server-to-server communications or via messages redirected by the client-side components in the manner illustrated in FIG. 3 and described below.

Within a particular affiliation group, a server 810 may identify the specific client-side components (and/or the number of client-side components) to which a set of metrics should be directed based on destination selection policy 910. For example, in some embodiments, destinations may be selected at random from among the affiliation group members, in a manner similar to that used in gossip-based protocols. In other embodiments, more deterministic destination selection techniques may be used, e.g., a round-robin approach may be utilized or a priority-based list of destinations may be used in which some client-side components are provided workload information more frequently than others. The timing of the messages containing redirected metrics may be determined based on message scheduling policy 914—e.g., whether the server 810 should include metrics in each communication directed to a client-side component, in every Nth communication directed to client-side components, at least once every N seconds to each client-side component, at times selected based on the network utilization level between the server and the client-side components, and so on. The particular messaging technique to be used—e.g., whether piggybacking on service responses is to be used, separate metric-specific messages are to be used, or some combination of piggybacking and metric-specific messages is to be used, may be indicated via transfer mechanism 918 in the depicted embodiment. In some embodiments, the transfer mechanism may be dependent on the sizes of the data payloads, relative to the packet sizes of transmission unit sizes used for messages between the servers and the client-side components. For example, according to one transfer mechanism setting, the server may determine how much (or which specific) client-side metrics information is to be transmitted in a given data-plane message based on how many bytes of data payload the communication has to include: e.g., if the message transmission size is 4096 bytes and the data payload occupies 3072 bytes, only 1024 bytes of metrics may be included.

At least in some scenarios, it may be advisable to make scheduling decisions using only those workload metrics that were collected within a selected time window, as metrics collected earlier may no longer be accurate enough to be of help in improving scheduling. Accordingly, a client metrics retention policy 920 may be applied in some embodiments, indicating how long metrics should be retained or redirected after they are initially received at the storage server. In some implementations, a global retention policy may be applied to all the metrics—e.g., metrics older than 300 seconds may be discarded. In other implementations, respective retention policies may be applied to different sets of metrics, e.g., on a per affiliation-group basis, on a per client-side component basis, on a per-client-account basis, on a per customer application basis, or on the basis of the types of the metrics being redirected (e.g., a different retention period may be used for CPU-related metrics than for disk-related metrics).

In some embodiments, only the metrics of a single client-side component may be redirected per message by the storage server, while in other embodiments the most recent metrics available for several or all members of an affiliation group may be transmitted. A metrics grouping policy 928 may be used to determine the set of metrics that should be packaged into a given message in some such embodiments. If a large amount of metrics data is collected by the server from each client-side component, only a subset of the metrics may be transmitted in one message based on the grouping policy in some embodiments, e.g., based on the maximum transmission unit size or packet size. In implementations in which piggybacking is being used, as indicated above, the set of metrics included or grouped within a given message to a client-side component may depend on the space remaining after the data payload of the message is taken into account.

Figure 10:
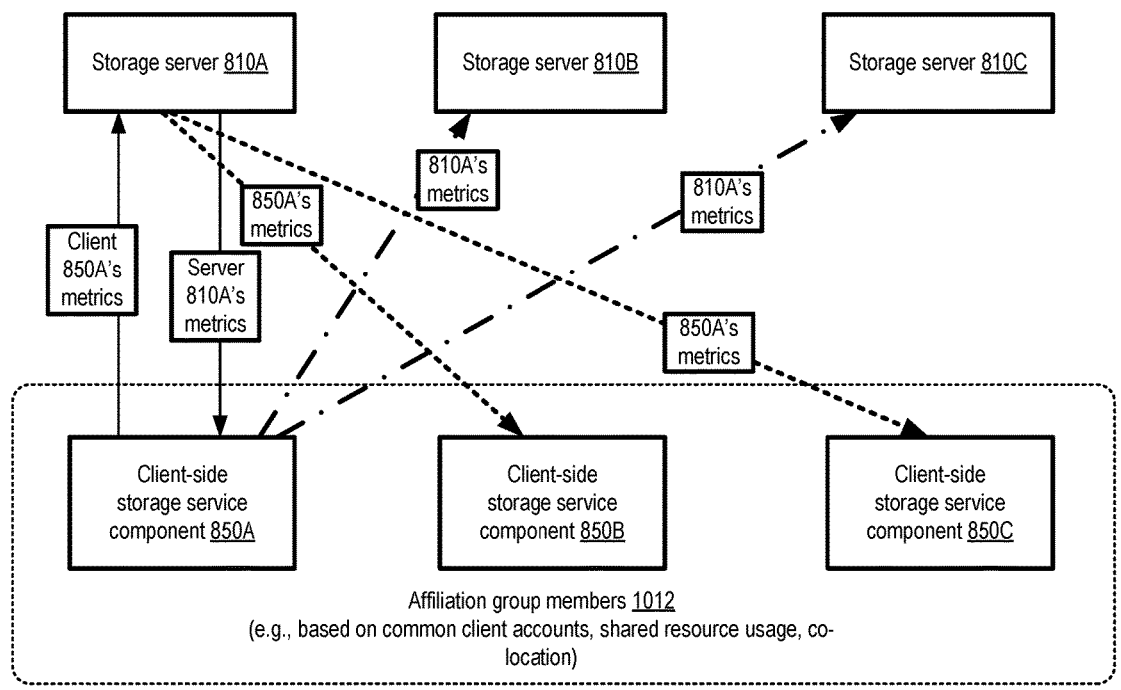
FIG. 10 illustrates an example of redirection of workload-related messages by both client-side and server components of a storage service, according to at least some embodiments.

In at least one embodiment, storage servers may also collect their own metrics and transmit them to client-side components for redirection to other storage servers, as illustrated in FIG. 10 and described below. Policies governing server-to-server redirection of workload metrics (e.g., at what intervals which metrics should be redistributed, and among which set of servers), similar in concept to some of the other policies shown in FIG. 9 but applicable to server-side metrics rather than client-side metrics, may be indicated by server-side propagation settings 928 in the depicted embodiment. It is noted that in various embodiments, not all the different parameters and policies indicated in FIG. 9 may be used, while other parameters (not shown in FIG. 9) may be used in other embodiments.

Bi-Directional Distribution of Workload Information

FIG. 10 illustrates an example of redirection of workload-related messages by both client-side and server components of a storage service, according to at least some embodiments. An affiliation group 1012 comprising client-side components 850A, 850B and 850C is shown. Membership in an affiliation group may be determined based on various factors in different embodiments, e.g., on the basis of common customer accounts for which I/O requests are being handled by different client-side components, the use of shared resources, similar customer applications, locality, or in some cases, simply because the different client-side components submit requests indicating that they wish to cooperate in resource scheduling using shared workload data.

In the depicted embodiment, client-side component 850A sends its workload metrics to one or more storage servers such as 810A. The server 810A redirects 850A's metrics to other members of the affiliation group 1012. Similarly, other servers such as 810B or 810C that receive 850A's metrics (or metrics from 850B or 850C) may also redirect the metrics to other members of the affiliation group 1012 based on various policies and the types of parameters as described above. In the depicted embodiment, in addition to redistributing client-side component metrics, the storage servers may propagate server-side metrics, using the client-side components as the redirecting intermediaries. Thus, storage server 810A sends some set of server-side metrics (e.g., the total read or write request rate it has handled over a previous N seconds) to client-side component 850A. The client-side component may redirect the server-side metrics to other servers such as 810B or 810C, e.g., using data-plane communication channels in a manner similar to the way that client-side metrics are distributed. A given storage server 810A may indicate the set of other servers to which it wishes to have its metrics propagated, e.g., as part of a control-plane message or in a data-plane message. The redirected server-side metrics may be used at the servers to make more informed admission control decisions, such as temporary modifications of server-side admission control parameters based on the workload trends observed at other servers.

In some embodiments in which workload metrics are incorporated within network messages that comprise data requests (e.g., read requests), data payloads (e.g., write requests or responses to read requests) or I/O responses (e.g., responses to write requests), a given data-plane message may include piggybacked client-side metrics, server-side metrics, or both types of metrics. Thus, for example, client-side component 850A's metrics may be sent to server 810A in a read request, and the response to the read request may include 810A's server-side metrics as well as client-side metrics from other components such as 850B in addition to the read data payload. In at least some embodiments, respective affiliation groups may be defined for workload information sharing among servers 810 as well as (or instead of) for workload information sharing among client-side components.

Roles and Relative Priorities of Affiliation Group Members

Figure 11:
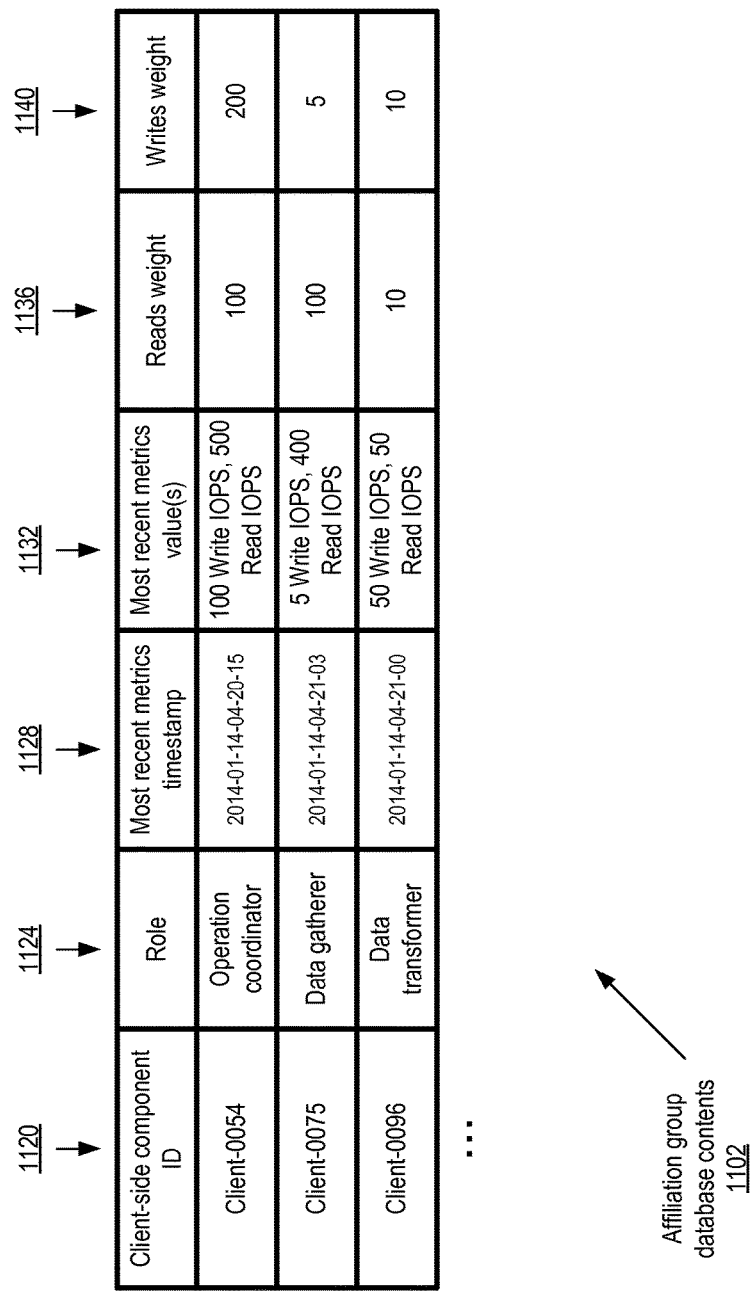
FIG. 11 illustrates example elements of an affiliation group database that may be maintained at client-side components of a storage service, according to at least some embodiments.

In some embodiments, the storage requests of different members of a client-side affiliation group may be treated as having different priorities, based for example upon the roles of the members with respect to some set of applications. Information regarding group member roles may be maintained in an affiliation group database at each of the various group members. As a result of the gradual distribution of workload metrics among the members, the contents of the database at different group members at a given point in time may not necessarily be identical in at least some embodiments. FIG. 11 illustrates example contents of an affiliation group database 1102 that may be maintained at client-side components 850 of a storage service, according to at least some embodiments. The affiliation group information is displayed in tabular form in FIG. 11, although any appropriate data structures may be used in different embodiments. As shown, the database may include a component identifier (in column 1120) as well as an indication of a logical or functional role (e.g., "coordinator", "data gatherer" etc.) associated with the component (column 1124).

Data indicating how recently the stored metrics (such as read and write request rates shown in column 1132) for each component of the affiliation group were received may be included in column 1128. Based on the role and/or on the request rates of various types of storage operations, a relative weight may be assigned to each component, which may for example be used to prioritize requests from one component over those of another (e.g., by the lower-priority component introducing delays between its back-end requests). In the depicted example, distinct weights are attached to reads and writes issued by each component; in other implementations, a single weight may be assigned to each component instead of separate weights for reads versus writes. In some embodiments, respective weights may be assigned for different size ranges of storage requests—e.g., large writes of greater than 512 KB issued by a client C1 may be assigned one weight, while small writes of less than 16 KB may from that same client C1 may be assigned a different weight. In various embodiments, the relative weights may be assigned by the members of the affiliation group after exchanging messages with each other, e.g., with the agreement of each of the client-side components involved. The proposed or approved relative weights may be transmitted via redirection along data-plane pathways among the affiliation group members in some embodiments, in a manner similar to that used for metrics propagation. In other embodiments, control-plane messages may be used to spread the relative weight information or priority information.

Methods of Workload Management Using Redirected Messages

Figure 12:
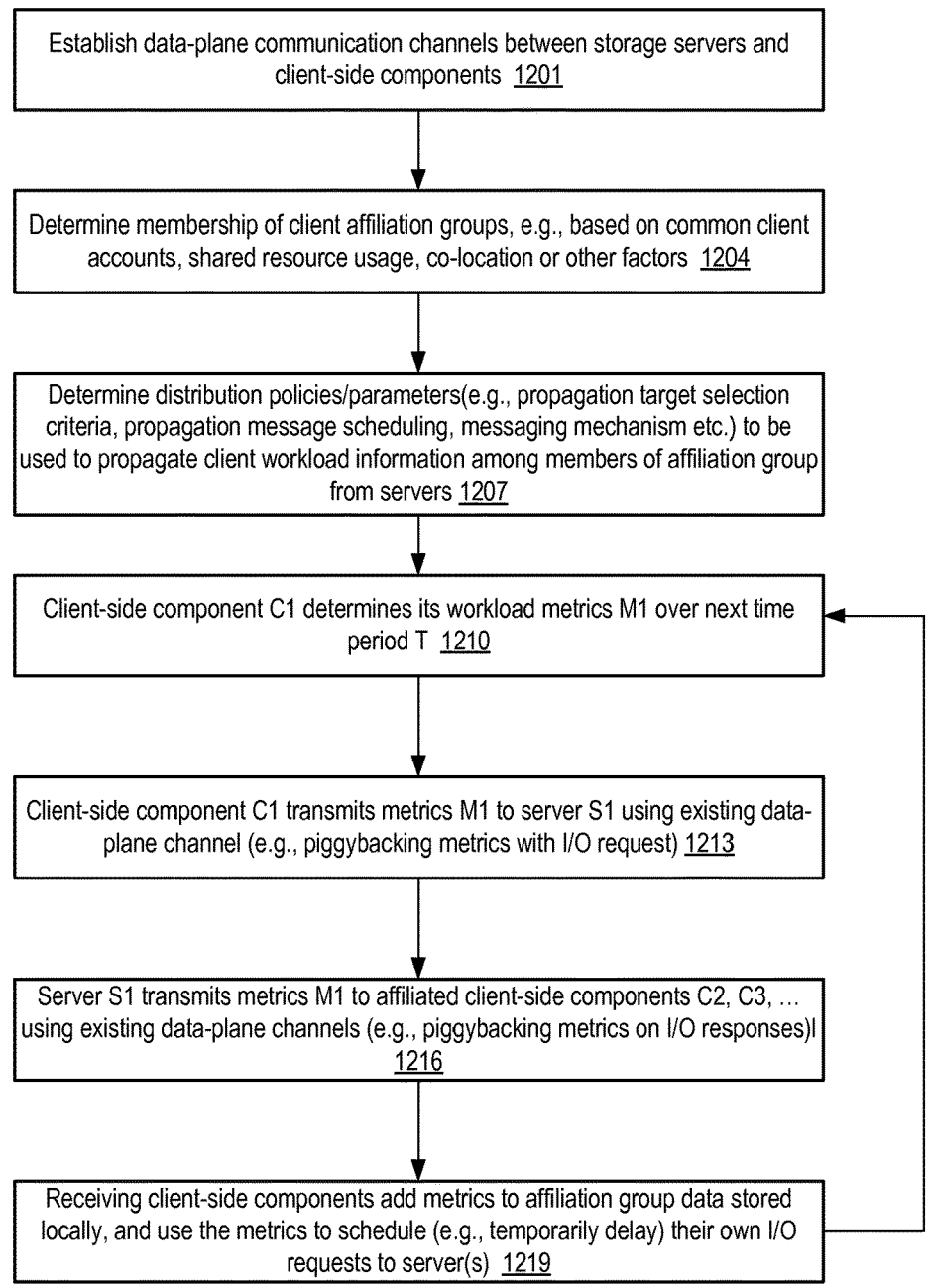
FIG. 12 is a flow diagram illustrating aspects of operations that may be performed to implement storage workload management using redirected messages, according to at least some embodiments.

FIG. 12 is a flow diagram illustrating aspects of operations that may be performed to implement storage workload management using redirected messages, according to at least some embodiments. As shown in element 1201, data-plane communication channels may be established between client-side components and server components of a storage service, intended primarily for data requests and responses as opposed to administrative or configuration-related channels that may also be established in some embodiments. The storage service may be multi-tenant in at least some embodiments, e.g., each storage server and/or client-side component may be responsible for handling storage requests of several different clients. In at least one embodiment, a block-level device interface (e.g., an interface that allows volumes to be attached and accessed using block-level APIs) may be supported by the storage service. Other types of programmatic interfaces such as file system interfaces, or web services APIs providing access to unstructured storage objects may also be supported in different embodiments.

As shown in element 1204, membership of client affiliation groups (sets of client-side components that may share workload metrics to improve collective scheduling for storage-related operations) may be determined. Various factors may be taken into consideration when determining which client-side components should cooperate in different embodiments, such as common ownership of the instances or applications being served, the use of shared resources such as partitioned volumes or multiply-attached volumes, locality with respect to the set of hardware being used, the types of applications being run, and so on.

The set of parameters and/or policies to be used to disseminate client-side component workload information to the appropriate affiliation group members by storage servers may be determined (element 1207). Such parameters may include the selection criteria to be used for metrics destinations, the frequency of messages, the messaging mechanism to be used for the metrics distribution, and so on. The distribution policies may differ from one storage server to another in at least some embodiments. Some distribution parameter settings may be set on the basis of preferences indicated by the customers of the storage service in one embodiment. The distribution policies may be adjusted over time, e.g., based on measurements of the effectiveness of the scheduling decisions being made. In one implementation a machine learning approach may be used, in which the parameters such as the interval between successive redirected metrics messages may be adjusted based on analysis of collected storage performance metrics.

A given client-side component C1 may collect its workload metrics M1 (e.g., rates of read requests, write requests etc.) over some time interval (element 1210), and transmit them to a selected storage server S1 (element 1213). In some embodiments, a pre-existing data-plane communication channel may be used, e.g., by piggybacking the metrics on a read request or a write request, or by sending a separate metrics-specific message via the data-plane channel. In turn, the server S1 may transmit the metrics M1 to one or more other client-side components C2, C3, . . . , using other pre-existing data-plane communication channels (element 1216), e.g., by including the metrics within responses to subsequent I/O requests received from those client-side components. The receiving client-side components may add the received metrics to their local collections of affiliation group data and metadata, and may use the received metrics to make scheduling decisions regarding other service requests to be submitted to the back end of the storage service (element 1219). The process may be repeated at various client-server combinations over different periods of time (e.g., operations similar to those indicate in elements 1210-1219 may be repeated), so that gradually a collective view of the workload conditions at other members of the affiliation group becomes available at each cooperating client-side component, and scheduling decisions can be improved to benefit the affiliation group as a whole.

Redirected workload metrics may be transmitted using non-data-plane messages in some embodiments, e.g., control-plane pathways may be used. In those embodiments in which workload information is transmitted via piggybacking on messages that would have been delivered in any case, the overhead of disseminating the workload information may be kept fairly low. In some embodiments, server-side workload metrics may also or instead be transmitted using a similar redirection technique, in which servers collect and transmit their own workload metrics to client-side components, and the client-side components then forward the metrics to other servers.

It is noted that in various embodiments, operations other than those illustrated in the flow diagrams of FIGS. 7 and 12 may be used to implement the workload management techniques described above. Some of the operations shown may not be implemented in some embodiments or may be implemented in a different order, or in parallel rather than sequentially. For example, with respect to FIG. 12, the establishment of data-plane communication channels may occur after affiliation groups are identified, or in parallel with the determination of affiliation group membership. In at least some embodiments, the techniques described above may be used for managing workloads at other types of storage devices than block devices—e.g., similar techniques may be used for unstructured storage devices that allow arbitrary storage objects to be accessed using web service interfaces rather than block-device I/O interfaces, or for accessing tables or partitions of relational or non-relational databases.

Use Cases

The techniques described above, of coordinated admission control for network-accessible storage devices, and of scheduling storage workloads based on redirected workload metrics, may be useful in a number of scenarios. As the storage needs of applications grow, larger and larger volumes may be configured for client applications, with proportionately higher throughput capacity rates provisioned for the volumes. For several reasons (such as the fact that the throughput capabilities of individual storage devices such as disks or disk arrays do not increase as fast as the demand for higher provisioned capacities, or for high availability/durability reasons) the storage service may partition larger volumes across multiple storage servers and/or devices at the back-end, without necessarily revealing the partitioning details to the clients. The storage service may then have to balance the workload directed to the different partitions. Client-side predictions of imbalanced workloads, similar to those described, may be very helpful in handling temporal and spatial variations in the workload. A partition that is likely to be very heavily utilized may be able to "borrow" provisioned capacity from another that is expected to be less busy, while to the client the large volume simply appears to be able to handle the high workload regardless of the variations. Similarly, the ability to temporarily transfer provisioned capacity among different volumes, rather than different partitions of the same volume, may benefit groups of client applications (or single client applications) that use several different volumes with non-uniform workloads. Dynamic admission control parameter modifications of the types described herein may be even more useful for multiply-attached volumes (in which work requests may be directed to a given volume from several different compute instances), at which the workload may vary to an even greater extent than in the case of singly-attached volumes.

The redirection-based techniques described above may provide a very efficient way of spreading workload metrics, especially when the metrics are piggybacked on messages that would be transmitted regardless of whether workload scheduling decisions were to be made on shared workload information. By allowing clients to collectively define affiliation groups, and then sharing workload information among the members of such groups, it may be possible to cost-effectively implement higher-level scheduling optimizations that benefit the group as a whole. As the workload level increases, the metrics may even be exchanged more frequently in some implementations, thus potentially leading to better scheduling under higher load levels.

Illustrative Computer System

Figure 13:
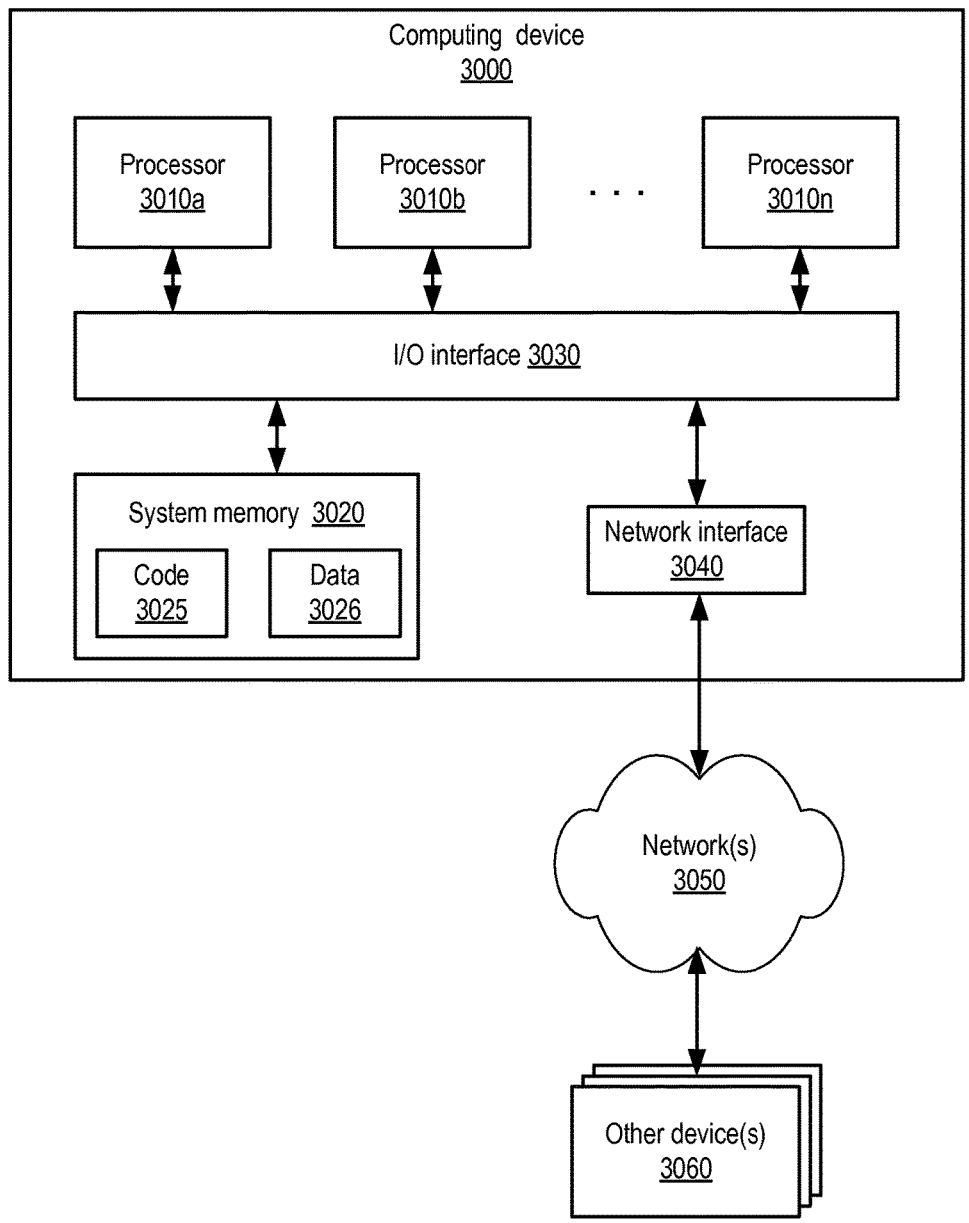
FIG. 13 is a block diagram illustrating an example computing device that may be used in at least some embodiments.

In at least some embodiments, a server that implements a portion or all of one or more of the technologies described herein, including the techniques to implement the components of the client-side and back-end components of a storage service may include a general-purpose computer system that includes or is configured to access one or more computer-accessible media. FIG. 13 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 12, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
determine, based on a plurality of requests of a storage workload at a first client-side component of a multi-tenant network-accessible storage service presenting a block-level programmatic interface, a metric associated with at least the plurality of requests of the storage workload directed from the first client-side component towards one or more storage servers during a particular time interval, wherein the storage workload includes block-level storage requests from one or more applications to block-level storage hosted by the one or more storage servers, and wherein the first client-side component is configured to communicate the block-level storage requests over one or more respective data-plane communication channels between the first client-side component and the one or more storage servers;
transmit the metric from the first client-side component to a particular storage server via a pre-existing data-plane communication channel created between the first client-side component and the particular storage server;
identify, at the particular storage server in accordance with a metric distribution policy, a second client-side component of the storage service to which the metric is to be propagated;
transmit the metric from the particular storage server to the second client-side component using a different pre-existing data-plane communication channel created between the second client-side component and the particular storage server; and
reschedule, at the second client-side component, based at least in part on an analysis of one or more workload metrics including the metric determined at the first client-side component, transmission of one or more storage requests to the one or more storage servers from the second client-side component.

2. The system as recited in claim 1, wherein the metric distribution policy comprises one or more parameters indicating one or more of: (a) a timing of propagation of the metric by the particular storage server, (b) criteria to be used to select the second client-side component, or (c) a number of client-side components to which the metric is to be propagated.

3. The system as recited in claim 1, wherein the one or more computing devices are further configured to:
generate, at the first client-side component, a network message comprising a request to perform an operation on one or more data blocks stored at the particular storage server; and
include, by the first client-side component, the metric within the network message.

4. The system as recited in claim 1, wherein the one or more computing devices are further configured to:
generate, at the particular storage server, a network message in response to a storage request received from the second client-side component, wherein the network message comprises a data payload; and
include, by the particular storage server, the metric within the network message.

5. The system as recited in claim 1, wherein the one or more computing devices are further configured to:
determine a first weight to be associated with storage requests issued by the first client-side component, relative to a second weight to be associated with storage requests issued by the second client-side component, wherein the first and second weights are to be used to modify storage request scheduling at one or more client-side components of the storage service; and
propagate respective indications of the first weight and the second weight of client-side components to the one or more client-side components via the particular storage server.

6. A method, comprising:
performing, by one or more computing devices:
determining, based on a plurality of requests of a storage workload at a first client-side component of a storage service, a metric associated with at least the plurality of requests of the storage workload directed from the first client-side component towards one or more server components of the storage service, wherein the storage workload includes storage requests from one or more applications to storage hosted by the one or more server components;
transmitting the metric from the first client-side component to a particular server component of the storage service;
identifying, at the particular server component in accordance with a distribution policy, a second client-side component of the storage service to which the metric is to be propagated;
transmitting the metric from the particular server component to the second client-side component; and
modifying a storage workload comprising one or more storage requests from the second client-side component to the one or more server components, based at least in part on the metric determined at the first client component.

7. The method as recited in claim 6, wherein the distribution policy comprises one or more parameters indicating one or more of: (a) a timing of said transmitting, relative to a receiving of the metric at the particular server component, (b) criteria to be used to select the second client-side component, or (c) a number of client-side components to which the metric is to be propagated.

8. The method as recited in claim 6, wherein said identifying the second client-side component comprises a random selection from a group of client-side components.

9. The method as recited in claim 6, further comprising performing, by the one or more computing devices:

identifying a plurality of client-side components including the first client-side component and second client-side component among which storage workload metrics are to be shared; and providing an indication of the plurality of client-side components to the particular server component.

10. The method as recited in claim 6, further comprising performing, by the one or more computing devices:

determining a first weight to be associated with storage requests issued by the first client-side component, relative to a second weight to be associated with storage requests issued by the second client-side component, wherein the first and second weights are to be used to modify storage request scheduling at one or more client-side components of the storage service; and propagating respective indications of the first weight and the second weight of client-side components to the one or more client-side components via the particular server component.

11. The method as recited in claim 6, further comprising submitting, by the first client-side component, storage requests to the one or more server components on behalf of one or more applications running at one or more compute instances executing at an instance host of a virtual computing service.

12. The method as recited in claim 11, wherein the instance host comprises a virtualization management software stack, and wherein the virtualization management software stack comprises the first client-side component.

13. The method as recited in claim 6, further comprising performing, by the one or more computing devices:

receiving, at a particular client-side component of the storage service, a server workload metric determined at a different server component of the storage service;

selecting, at the particular client-side component, a target server component to which the server workload metric is to be propagated to be used for admission control decisions at the target server component; and transmitting the server workload metric to the target server component from the particular client-side component.

14. The method as recited in claim 6, further comprising performing, by the one or more computing devices:

establishing a data-plane communication channel between the first client-side component and the particular server component, to be used at least in part for storage requests directed to the particular server component and responses to the storage requests from the particular server component; and transmitting the metric from the first client-side component to the particular server component via the data-plane communication channel.

15. The method as recited in claim 6, further comprising performing, by the one or more computing devices:

generating, at the particular server component, a network message in response to a storage request received from the second client-side component; and including, by the particular server component, the metric within the network message.

16. A non-transitory computer-accessible storage medium storing program instructions that when executed on one or more processors:

determine, based on a plurality of requests of a storage workload at a first client-side component of a storage service, a metric associated with at least the plurality of requests of the storage workload directed from the first client-side component towards one or more server components of the storage service, wherein the storage workload includes storage requests from one or more applications to storage hosted by the one or more server components;

transmit the metric from the first client-side component to a particular server component of the storage service, wherein the particular server component is configured to propagate the metric to a different client-side component of the storage service;

receive, at the first client-side component of the storage service from the particular server component, a different metric of a storage workload of a second client-side component of the storage service; and reschedule at least one storage request at the first client-side component to the one or more server components based at least in part on the different metric.

17. The non-transitory computer-accessible storage medium as recited in claim 16, wherein the instructions when executed at the one or more processors:

establish a data-plane communication channel between the first client-side component and the particular server component, to be used at least in part for storage requests directed to the particular server component and responses to the storage requests from the particular server component; and transmit the metric from the first client-side component to the particular server component via the data-plane communication channel.

18. The non-transitory computer-accessible storage medium as recited in claim 16, wherein the instructions when executed at the one or more processors:

generate, at the first client-side component, a network message comprising a request to perform an operation on one or more data blocks stored at the particular server component; and including, by the first client-side component, the metric within the network message.

19. The non-transitory computer-accessible storage medium as recited in claim 16, wherein the instructions when executed at the one or more processors:

receive, at the first client-side component, a server workload metric determined at a different server component of the storage service;

select, at the first client-side component, a target server component to which the server workload metric is to be propagated to be used for admission control decisions at the target server component; and transmit the server workload metric to the target server component from the first client-side component.

20. The non-transitory computer-accessible storage medium as recited in claim 16, wherein the instructions when executed at the one or more processors:

determine a first weight to be associated with storage requests issued by the first client-side component, relative to a second weight to be associated with storage requests issued by a second client-side component, wherein the first and second weights are to be used to modify storage request scheduling at one or more client-side components of the storage service; and transmit respective indications of the first weight and the second weight of client-side components to the particular server component for propagation to the one or more client-side components.

* * * * *